(12) United States Patent
Kim

(10) Patent No.: US 12,526,831 B2
(45) Date of Patent: Jan. 13, 2026

(54) METHOD FOR TRANSMITTING AND RECEIVING DATA IN WIRELESS COMMUNICATION SYSTEM SUPPORTING FULL DUPLEX COMMUNICATION, AND APPARATUS THEREFOR

(71) Applicant: LG ELECTRONICS INC., Seoul (KR)

(72) Inventor: Soojin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 345 days.

(21) Appl. No.: 17/924,606

(22) PCT Filed: May 29, 2020

(86) PCT No.: PCT/KR2020/006989
§ 371 (c)(1),
(2) Date: Nov. 10, 2022

(87) PCT Pub. No.: WO2021/241789
PCT Pub. Date: Dec. 2, 2021

(65) Prior Publication Data
US 2023/0189312 A1 Jun. 15, 2023

(51) Int. Cl.
*H04W 72/541* (2023.01)
*H04L 1/1829* (2023.01)
(52) U.S. Cl.
CPC ......... *H04W 72/541* (2023.01); *H04L 1/1864* (2013.01)

(58) Field of Classification Search
CPC .................... H04W 72/541; H04L 1/1864
See application file for complete search history.

(56) References Cited

U.S. PATENT DOCUMENTS

2010/0246544 A1* 9/2010 Brisebois ............ H04W 24/00
370/338
2014/0029569 A1* 1/2014 Ni ........................ H04W 24/02
370/330

(Continued)

FOREIGN PATENT DOCUMENTS

WO 2017217584 A1 12/2017
WO 2019098395 A1 5/2019

*Primary Examiner* — Huy D Vu
*Assistant Examiner* — Robert Ma
(74) *Attorney, Agent, or Firm* — BRYAN CAVE LEIGHTON PAISNER LLP

(57) ABSTRACT

The present document relates to a method by which a terminal transmits and receives a signal in a wireless communication system. Disclosed is a method for transmitting and receiving a signal, comprising the steps of: receiving a signal through a first slot from a base station; transmitting, to the base station, information including hybrid automatic repeat and request acknowledgment/negative-acknowledgement (HARQ-ACK/NACK) feedback for the signal through an uplink physical channel; and receiving, from the base station, channel configuration information on the basis of the information, wherein the information includes information on whether interference cancellation of the signal succeeds, whether or not the interference cancellation of the signal succeeds is determined for every slot, and the information is transmitted from a slot next to the first slot.

5 Claims, 28 Drawing Sheets

(56) References Cited

U.S. PATENT DOCUMENTS

2016/0359608 A1   12/2016  Noh et al.
2018/0294895 A1   10/2018  Lee
2019/0335471 A1*  10/2019  Kim ..................... H04L 5/0053
2019/0357224 A1   11/2019  Li et al.

* cited by examiner

FIG. 6
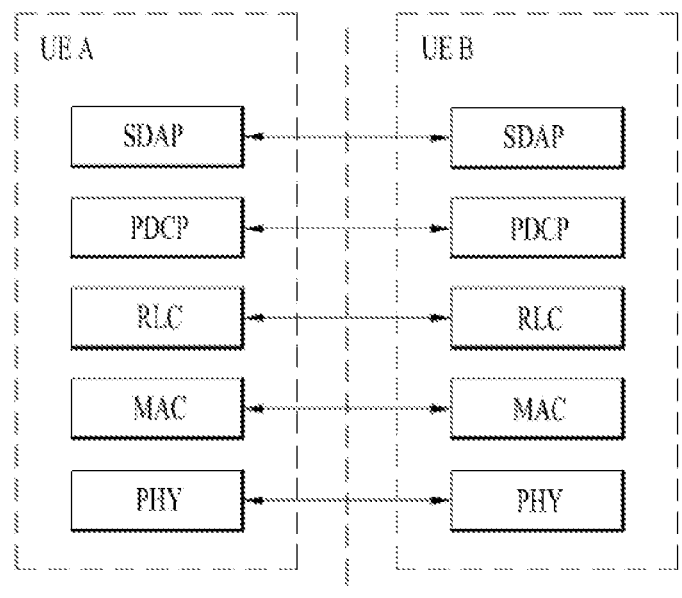
(a)
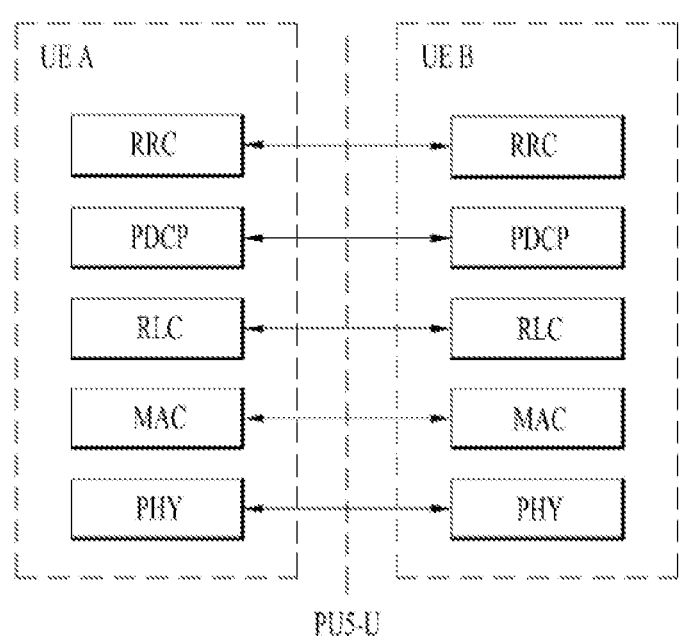
(b)

METHOD FOR TRANSMITTING AND RECEIVING DATA IN WIRELESS COMMUNICATION SYSTEM SUPPORTING FULL DUPLEX COMMUNICATION, AND APPARATUS THEREFOR

This application is a National Stage filing under 35 U.S.C. 371 of International Application No. PCT/KR2020/006989, filed May 29, 2020, which is hereby incorporated by reference herein in its entirety.

TECHNICAL FIELD

The present disclosure relates to a method and apparatus for transmitting and receiving data related to full duplex radio (FDR) in a wireless communication system supporting full duplex radio (FDR).

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between terminals without going through a base station (BS). SL is being considered as one way to solve the burden of the base station due to the rapidly increasing data traffic.

Also, the UE or vehicle may receive resource allocation for an uplink signal and a resource allocation for a downlink signal from the base station. The UE or vehicle may be allocated resources for the uplink signal from the base station through uplink control information (UCI), or may receive resources for the downlink signal from the base station through uplink control information (DCI).

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

SUMMARY

The problem to be solved is as follows. If the interworking operation between the UE and the BS is performed according to the existing HARQ procedure irrespective of self-IC failure of the FDR UE, a lot of time is consumed until a new configuration is applied to the UE for use in a system having a large HARQ RTT (Round Trip Time) delay, resulting in reduction in UE performance. In order to address this issue, an object of the present disclosure is to provide a method for reducing such delay.

It will be appreciated by persons skilled in the art that the objects that could be achieved with the present disclosure are not limited to what has been particularly described hereinabove and the above and other objects that the present disclosure could achieve will be more clearly understood from the following detailed description.

In accordance with an aspect of the present disclosure, a method for transmitting and receiving signals by a user equipment (UE) in a wireless communication system may include: receiving a signal from a base station (BS) through a first slot; transmitting, to the base station (BS), information including hybrid automatic repeat and request acknowledgement/negative-acknowledgement (HARQ-ACK/NACK) feedback for the signal through an uplink physical channel; and receiving, from the base station (BS), channel configuration information based on the information, wherein the information includes information as to whether interference cancellation of the signal is successful, whether the interference cancellation of the signal is successful is determined for every slot, and the information is transmitted in a next slot of the first slot.

The information as to whether the interference cancellation is successful may be indicated in a bitmap format.

Based on a case in which the bit is set to '0', success of the interference cancellation may be indicated. Based on a case in which the bit is set to '1', failure of the interference cancellation may be indicated.

Based on a case in which the uplink channel is a physical uplink control channel, the bitmap may be determined to be a reserved bit.

Based on a case in which the uplink channel is a physical uplink data channel, the bitmap may be included in a header of the physical uplink data channel.

Based on a case in which a sounding reference signal (SRS) is transmitted through the uplink channel, a cyclic shift (CS) value of the sounding reference signal (SRS) may be fixed to zero '0'.

The method may further include, based on a case in which an uplink channel to be transmitted to the next slot of the first slot does not exist, transmitting information as to whether the interference cancellation is successful through a physical channel corresponding to the earliest slot from among an uplink slot transmitted based on data control information (DCI) and an uplink slot that is periodically transmitted.

The method may further include: based on a case in which the information as to whether the interference cancellation is successful indicates failure of the interference cancellation, changing the channel configuration information.

In accordance with another aspect of the present disclosure, a user equipment (UE) for transmitting and receiving signals in a wireless communication system may include a transceiver, and a processor, wherein the transceiver is configured to receive a signal from a base station (BS) through a rust slot; transmit, to the base station (BS), information including hybrid automatic repeat and request acknowledgement/negative-acknowledgement (HARQ-ACK/NACK) feedback for the signal through an uplink physical channel; and receive, from the base station (BS), channel configuration information based on the information, wherein the information includes information as to whether interference cancellation of the signal is successful, whether the interference cancellation of the signal is successful is determined for every slot, and the information is transmitted in a next slot of the first slot.

In accordance with another aspect of the present disclosure, a method for transmitting and receiving signals by a base station (BS) in a wireless communication system may include: transmitting a signal to a user equipment (UE) through a first slot; receiving, from the user equipment (UE), information including hybrid automatic repeat and request acknowledgement/negative-acknowledgement (HARQ-ACK/NACK) feedback for the signal through an uplink physical channel; and transmitting, to the user equipment (UE), channel configuration information based on the information, wherein the information includes information as to whether interference cancellation of the signal is successful, whether the interference cancellation of the signal is successful is determined for every slot, and the information is transmitted in a next slot of the first slot.

In accordance with another aspect of the present disclosure, a base station (BS) for transmitting and receiving signals in a wireless communication system may include a transceiver and a processor. The transceiver is configured to transmit a signal to a user equipment (UE) through a first slot receive, from the user equipment (UE), information including hybrid automatic repeat and request acknowledgement/negative-acknowledgement (HARQ-ACK/NACK) feedback for the signal through an uplink physical channel; and transmit, to the user equipment (UE), channel configuration information based on the information, wherein the information includes information as to whether interference cancellation of the signal is successful, whether the interference cancellation of the signal is successful is determined for every slot, and the information is transmitted in a next slot of the first slot.

In accordance with another aspect of the present disclosure, a device for a user equipment (UE) may include at least one processor, and at least one memory operatively connected to the at least one processor, and configured to store instructions such that the at least one processor performs specific operations by executing the instructions, wherein the specific operations include: receiving a signal from a base station (BS) through a first slot; transmitting, to the base station (BS), information including hybrid automatic repeat and request acknowledgement/negative-acknowledgement (HARQ-ACK/NACK) feedback for the signal through an uplink physical channel; and receiving, from the base station (BS), channel configuration information based on the information, wherein the information includes information as to whether interference cancellation of the signal is successful, whether the interference cancellation of the signal is successful is determined for every slot, and the information is transmitted in a next slot of the first slot.

In accordance with another aspect of the present disclosure, a computer-readable storage medium is configured to store at least one computer program including instructions such that at least one processor performs operations for a user equipment (UE) by executing the instructions, wherein the operations include: receiving a signal from a base station (BS) through a first slot: transmitting, to the base station (BS), information including hybrid automatic repeat and request acknowledgement/negative-acknowledgement (HARQ-ACK/NACK) feedback for the signal through an uplink physical channel; and receiving, from the base station (BS), channel configuration information based on the information, wherein the information includes information as to whether interference cancellation of the signal is successful, whether the interference cancellation of the signal is successful is determined for every slot, and the information is transmitted in a next slot of the first slot.

As is apparent from the above description, when self-interference occurs in the FDR environment, the time for reporting the self-IC failure to the base station (BS) is shortened so that a UE operation time for which the BS can operate the UE with a new configuration is also shortened, thereby increasing performance of the UE.

The effects that can be achieved through the embodiments of the present disclosure are not limited to what has been particularly described hereinabove and other effects which are not described herein can be derived by those skilled in the an from the following detailed description.

BRIEF DESCRIPTION OF DRAWINGS

The accompanying drawings, which are included to provide a further understanding of the disclosure and are incorporated in and constitute a pan of this application, illustrate embodiments of the disclosure and together with the description serve to explain the principle of the disclosure.

FIG. 6 illustrates a radio protocol architecture for SL communication.

Best Mode

Figure 1:
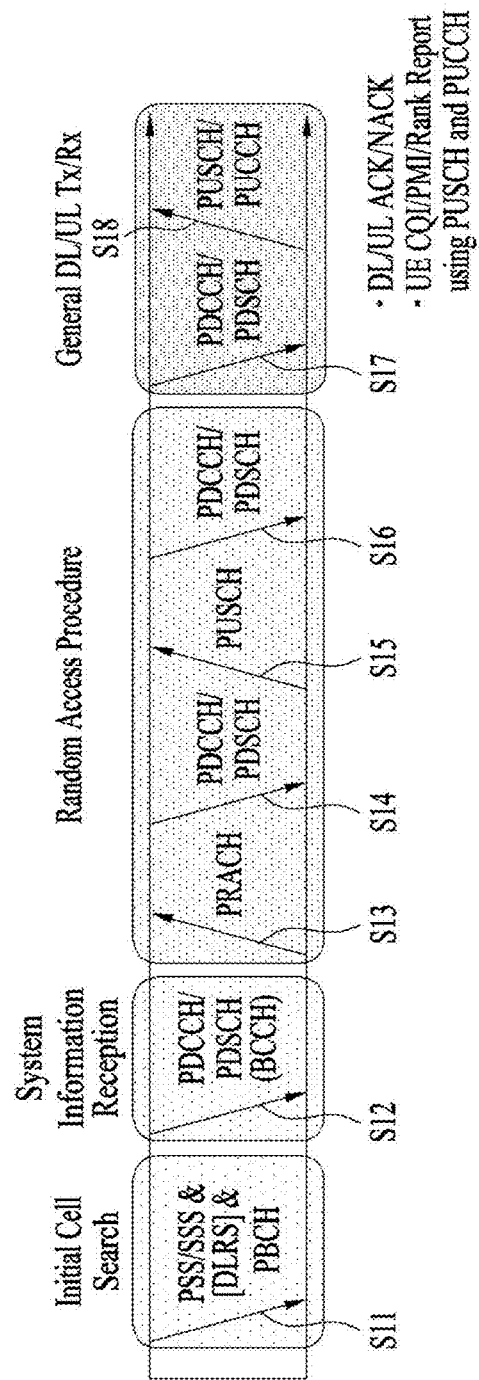
FIG. 1 illustrates physical channels and a general signal transmission method using the physical channels as an exemplary wireless communication system.

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between terminals without going through a base station (BS). SL is being considered as one way to solve the burden of the base station due to the rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

Technology described below may be used in various radio access systems such as a code division multiple access (CDMA) system, a frequency division multiple access (FDMA) system, a time division multiple access (TDMA) system, an orthogonal frequency division multiple access (OFDMA) system, and a single-carrier frequency division multiple access (SC-FDMA) system. CDMA may be implemented by radio technology such as universal terrestrial radio access (UTRA) or CDMA2000. TDMA may be implemented by radio technology such as global system for mobile communications (GSM), general packet radio service (GPRS), or enhanced data rates for GSM evolution (EDGE). OFDMA may be implemented by radio technology such as institute of electrical and electronics engineers (IEEE) 802.11 (Wi-Fi), IEEE 802.16 (WiMAX), IEEE 802.20, or evolved-UTRA (E-UTRA). IEEE 802.16m is an evolution of IEEE 802.16e and provides backward compatibility with systems based on IEEE 1102.16e. UTRA is part of universal mobile telecommunications system (UMTS). 3rd generation partnership project (3GPP) long-term evolution (LTE) is part of evolved UMTS (E-UMTS) using E-UTRA. 3GPP LTE employs OFDMA for downlink and SC-FDMA for uplink. LTE-advanced (LTE-A)/LTE-A pro is an evolved version of 3GPP LTE.

5G NR is a successor technology of LTE-A, and is a new clean-slate mobile communication system with characteristics such as high performance, low latency, and high availability. 5G NR can utilize all available spectrum resources, from low frequency bands below 1 GHz to intermediate frequency bands from 1 GHz to 10 GHz and high frequency (millimeter wave) bands above 24 GHz.

In order to clarify technical features of various embodiments of the present disclosure, various embodiments of the present disclosure are mainly described not only for the 3GPP LTE/LTE-A system but also for the 3GPP NR system, but can also be applied to the IEEE 802.16e/m system, etc.

In a wireless access system, a user equipment (UE) may receive information from a base station (BS) through downlink (DL) and may transmit information to the BS through uplink (UL). Transmission/reception (Tx/Rx) information between the UE and the BS may include general data information and various control information, and various physical channels may exist according to types/usages of the Tx/Rx information.

FIG. 1 illustrates physical channels and a general method for transmitting signals on the physical channels.

Referring to FIG. 1, when a UE is powered on or enters a new cell, the UE performs initial cell search (S11). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB.

Then the UE may acquire information broadcast in the cell by receiving a physical broadcast channel (PBCH) from the eNB.

During the initial cell search, the UE may monitor a DL channel state by receiving a DownLink reference signal (DL RS).

After the initial cell search, the UE may acquire detailed system information by receiving a physical downlink control channel (PDCCH) and receiving a physical downlink shared channel (PDSCH) based on information included in the PDCCH (S12).

If the UE initially accesses the eNB or has no radio resources for signal transmission to the eNB, the UE may perform a random access procedure with the eNB (S13 to S16). In the random access procedure, the UE may transmit a predetermined sequence as a preamble on a physical random access channel (PRACH) (S13 and S15) and may receive a response message to the preamble on a PDCCH and a PDSCH associated with the PDCCH (S14 and S16). In the case of a contention-based RACH, the UE may additionally perform a contention resolution procedure.

On the other hand, when the random access process is performed in two steps, S13/S15 may be performed as one operation in which the UE performs data transmission, and S14/S16 may be performed as one operation in which the BS performs data transmission.

After the above procedure, the UE may receive a PDCCH and/or a PDSCH from the eNB (S17) and transmit a physical uplink shared channel (PUSCH) and/or a physical uplink control channel (PUCCH) to the eNB (S18), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. in the 3GPP LTE system, the UE may transmit control information such as a CQI, a PMI, an RI, etc. on a PUSCH and/or a PUCCH.

In general, UC1 is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
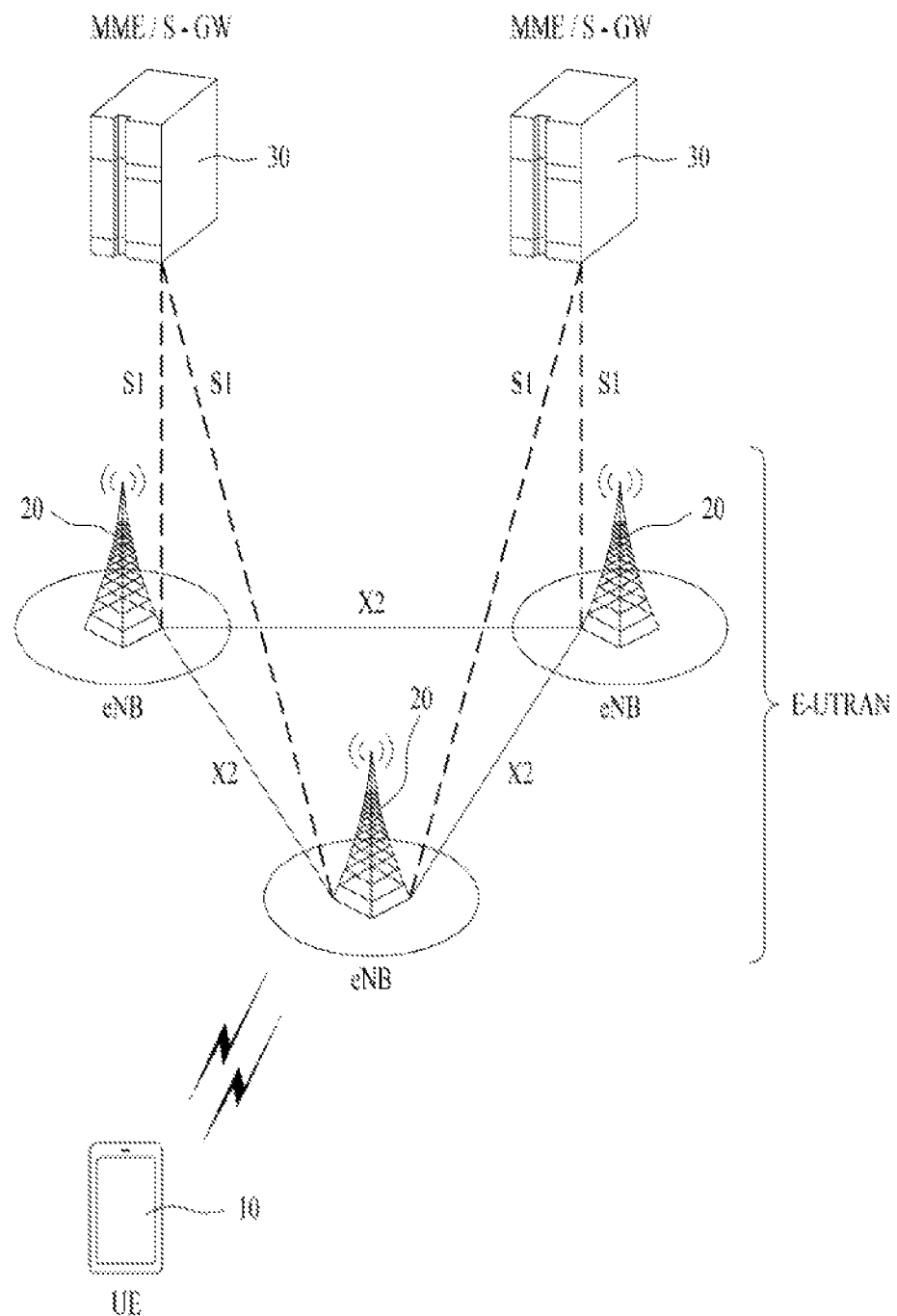
FIG. 2 illustrates the structure of an NR system to which embodiment(s) are applicable.

FIG. 2 illustrates the structure of a NR system to which the present disclosure is applicable.

Figure 4:
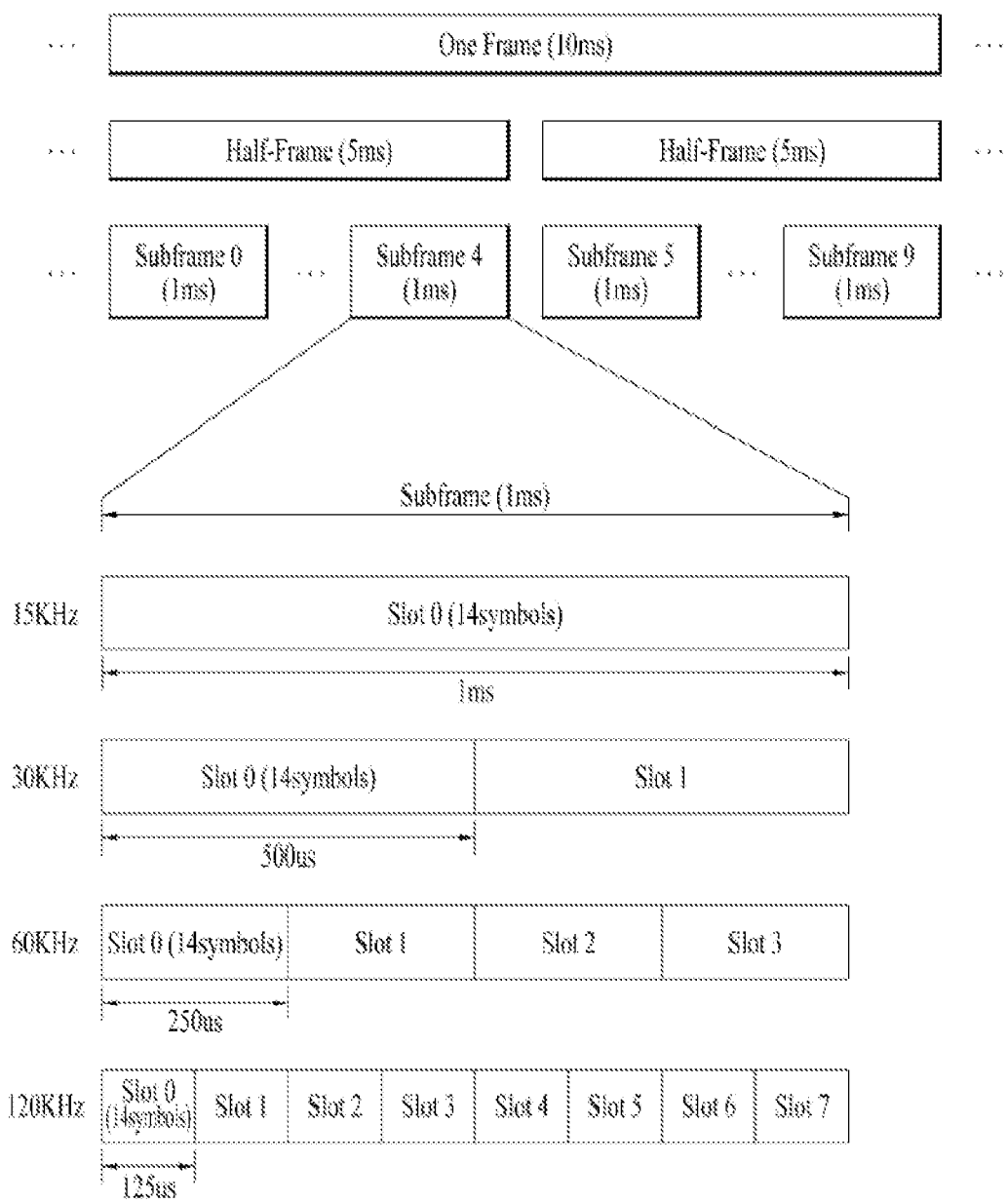
FIG. 4 illustrates the structure of an NR radio frame to which embodiment(s) are applicable.

Referring to FIG. 2, a next generation radio access network (NG-RAN) may include a next generation Node B (gNB) and/or an eNB, which provides user-plane and control-plane protocol termination to a UE. In FIG. 4, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 3:
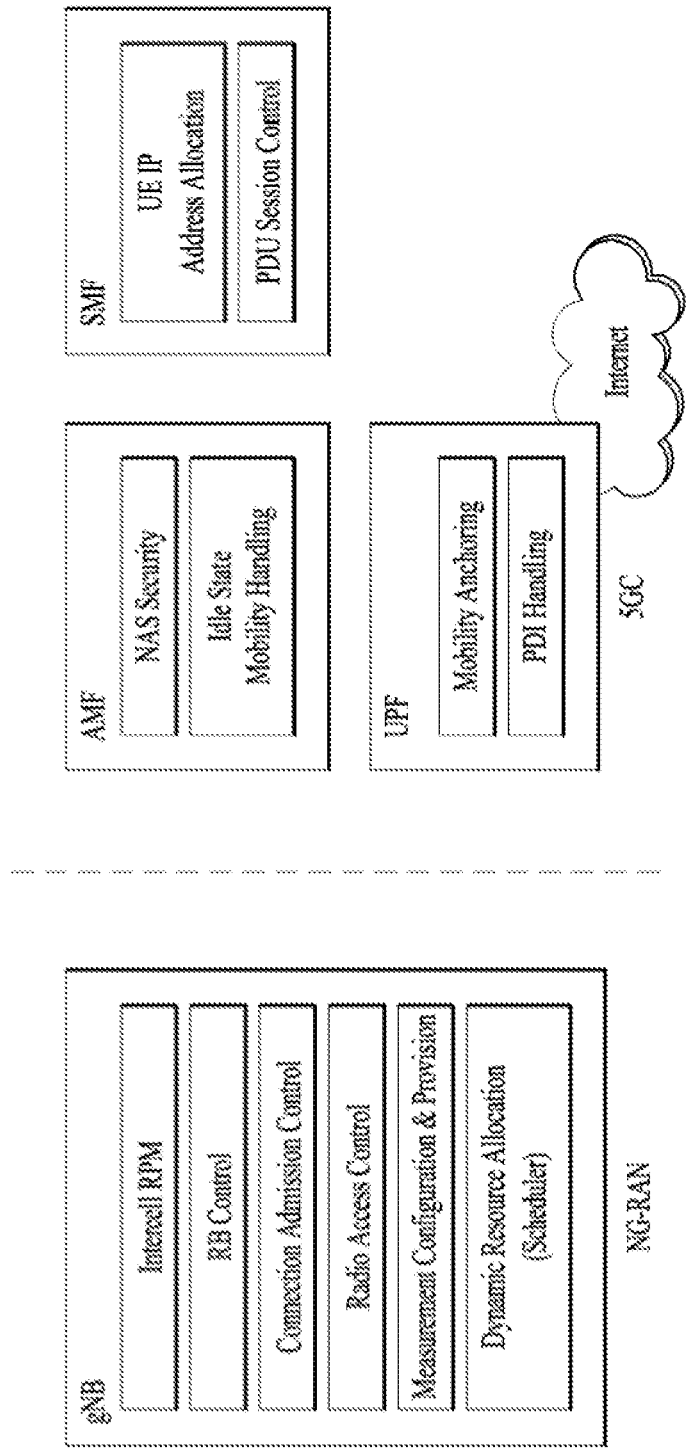
FIG. 3 illustrates functional split between an NG-RAN and a 5GC to which embodiment(s) are applicable.

FIG. 3 illustrates functional split between the NG-RAN and the 5GC to which the present disclosure is applicable.

Referring to FIG. 3, a gNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control.

FIG. 4 illustrates the structure of a NR radio frame to which the present disclosure is applicable.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,u}_{slot}$, and the number of slots per subframe $N^{subframe,u}_{slot}$ according to an SCS configuration μ in the NCP case.

TABLE 1

| SCS (15 * 2u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15 * 2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GU may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR 1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 5:
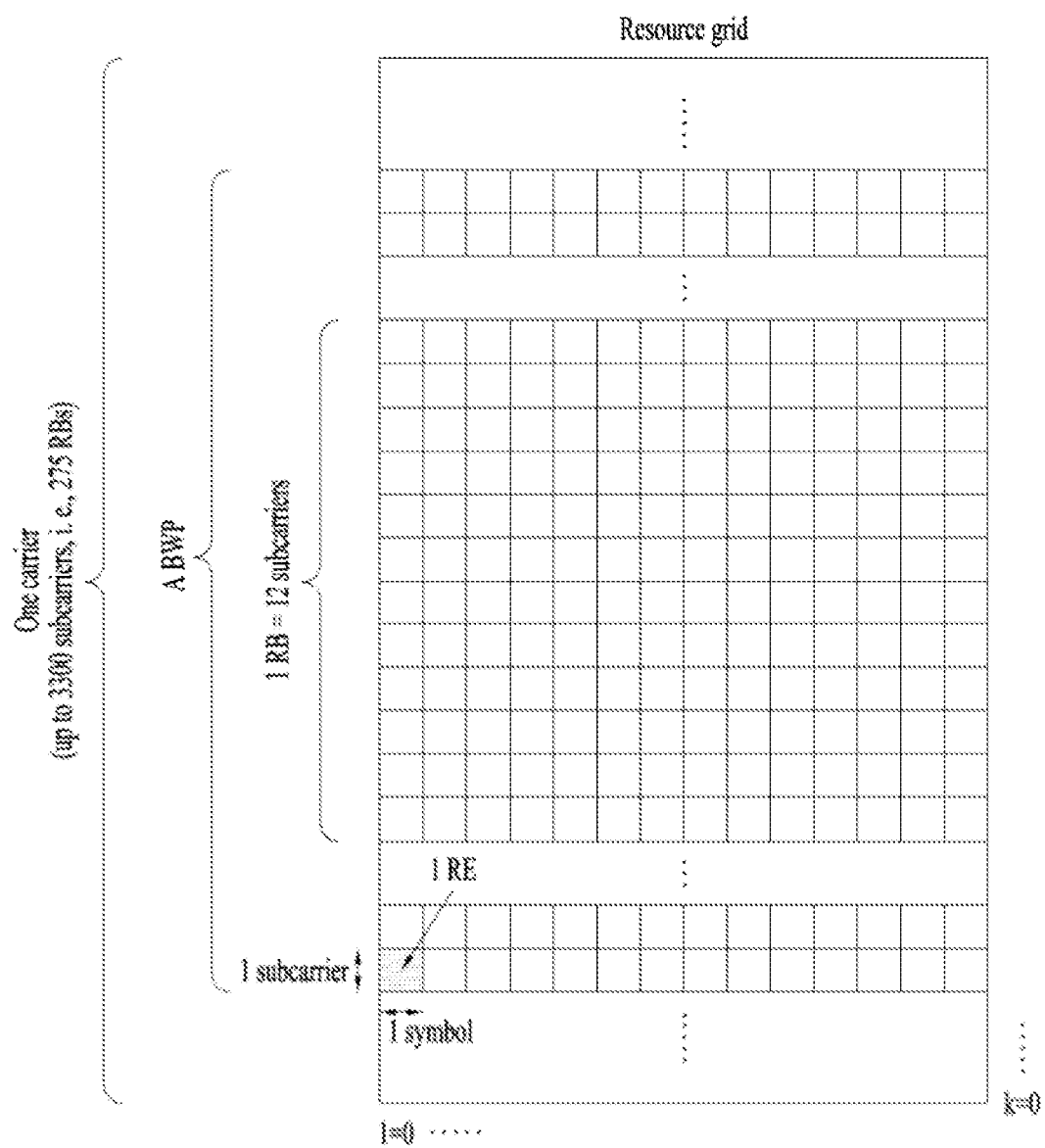
FIG. 5 illustrates the slot structure of an NR frame to which embodiment(s) are applicable.

FIG. 5 illustrates the slot structure of a NR frame to which the present disclosure is applicable.

Referring to FIG. 5, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

FIG. 6 illustrates a radio protocol architecture for SL communication. Specifically, FIG. 6-(a) shows a user plane protocol stack of NR, and FIG. 8-(b) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre)set sidelink BWP (SL BWP). For example, the bandwidth of the S-SSB may be 11 resource blocks (RBs). For example, the PSBCH may span 11 RBs. The frequency position of the S-SSB may be (pre)set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be pre-configured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 7:
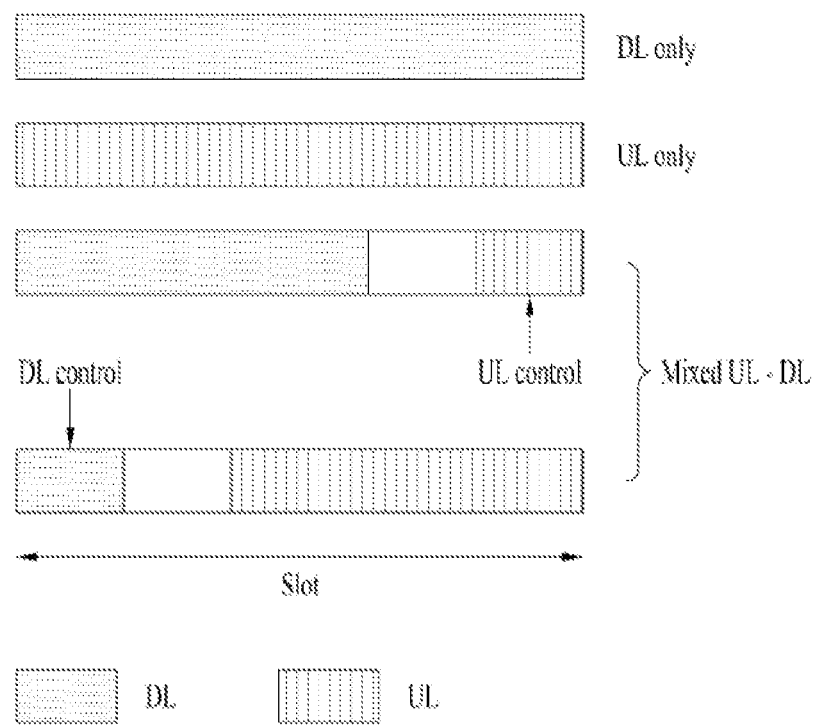
FIG. 7 illustrates a structure of a self-contained slot.

FIG. 7 illustrates a structure of a self-contained slot.

In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration
   DL region+Guard period (GP)+UL control region
   DL control region+GP+UL region
   DL region: (i) DL data region, (ii) DL control region+DL data region
   UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. The GP provides a time gap in the process of the UE switching from the transmission mode to the reception mode or from the reception mode to the transmission mode. Some symbols at the time of switching from DL to UL within a subframe may be configured as the GP.

In the present disclosure, a base station (BS) may be, for example, a gNode B (gNB).

Figure 8:
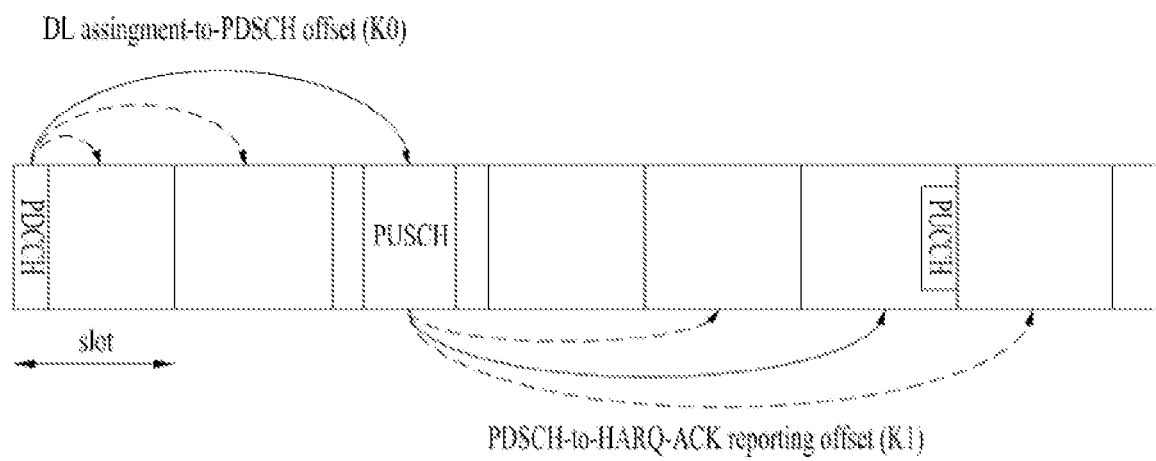
FIG. 8 illustrates an acknowledgment/negative acknowledgment (ACK/NACK) transmission process.

FIG. 8 illustrates an ACK/NACK transmission process.

Referring to FIG. 8, the UE may detect a PDCCH in slot #n. The PDCCH includes DL scheduling information (e.g., DCI format 1_0 or DCI format 1_1). The PDCCH indicates a DL assignment-to-PDSCH offset, K0 and a PDSCH-to-HARQ-ACK reporting offset, K1. For example, DCI format 1_0 and DCI format 1_1 may include the following information.

Frequency domain resource assignment: Indicates an RB set assigned to a PDSCH.

Time domain resource assignment: Indicates K0 and the starting position (e.g. OFDM symbol index) and length (e.g. the number of OFDM symbols) of the PDSCH in a slot PDSCH-to-HARQ feedback timing indicator: Indicates K1.

Alter receiving a PDSCH in slot #(n+K0) according to the scheduling information of slot #n, the UE may transmit UCI on a PUCCH in slot #(n+K1). The UCI includes a HARQ-ACK response to the PDSCH. In the case where the PDSCH is configured to carry one TB at maximum, the HARQ-ACK response may be configured in one bit. In the case where the PDSCH is configured to carry up to two TBs, the HARQ-ACK response may be configured in two bits if spatial bundling is not configured and in one bit if spatial bundling is configured. When slot #(n+K1) is designated as a HARQ-ACK transmission timing for a plurality of PDSCHs, UCI transmitted in slot g(n+K1) includes HARQ-ACK responses to the plurality of PDSCHs.

Overview of FDR System and Interference Factors in FDR

The FDR transmission/reception (Tx/Rx) system capable of simultaneously transmitting and receiving UL and DL signals on the same frequency band may perform frequency division or time division so that spectral efficiency of the FDR Tx/Rx system can be two times higher than the existing system. As a result, the FDR Tx/Rx system is spotlighted as one of the core technologies of the next generation 5G mobile communication system.

FDR configured to use a single frequency transmission band can be defined as a transmission resource configuration method that simultaneously performs data transmission/reception through a single frequency transmission band from the point of view of any wireless device. As a special example of the FDR, wireless communication between a general BS (or a repeater, a relay node, a remote radio head (RRH), etc.) and a wireless UE can be expressed as a transmission (Tx) resource configuration method in which DL transmission and UL reception of the BS and DL reception and UL transmission of the wireless UE are simultaneously performed through a single frequency transmission band. As another example, in a device-to-device (D2D) direct communication situation between wireless UEs, the FDR can also be expressed as a transmission resource configuration method in which transmission and reception of the wireless UEs are simultaneously performed in the same frequency transmission band. In the following disclosure, a general method for performing wireless communication between the BS and the wireless UE and FDR-related proposed technologies will be described, but the scope or spirit of the present disclosure is not limited thereto. Furthermore, the present disclosure may include an example of wireless communication with a network wireless device capable of wirelessly communicating with the UE other than the BS, and may further include D2D direct communication as needed.

Figure 9:
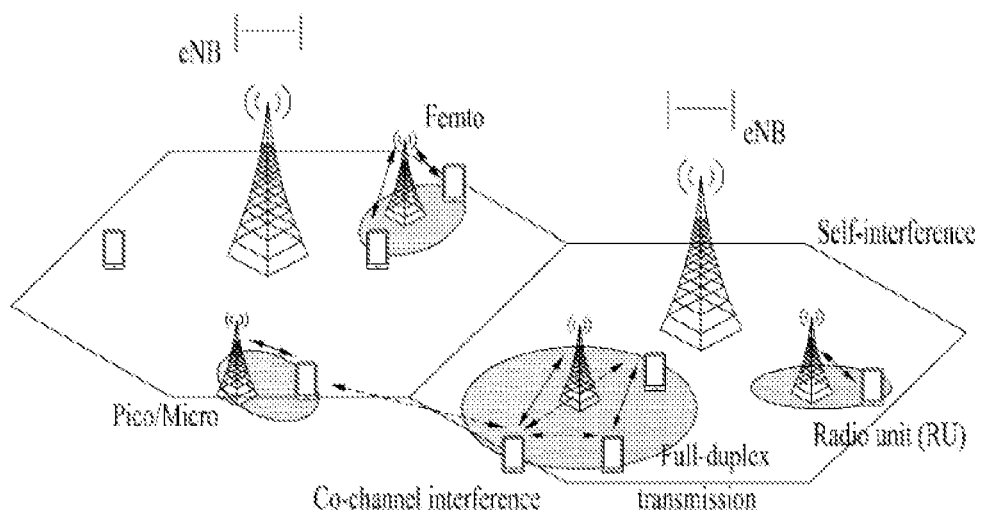
FIG. 9 shows the conceptual diagram of a user equipment and base station supportive of FDR.

FIG. 9 shows the conceptual diagram of a user equipment and base station supportive of FDR.

In the FDR situation shown in FIG. 9, total three types of interferences exist as follows.

Intra-device self-interference: As transmission and reception are performed with the same time and frequency resources, a signal transmitted by a device itself is simultaneously received as well as a desired signal. In this case, as the signal transmitted by the device itself barely has attenuation and is received by a Rx antenna of its own, it is received with power much greater than that of the desired signal, which means that it works as interference.

UE to UE inter-link interference: A UL signal transmitted by a UE is received by an adjacently located UE, thereby working as interference.

BS to BS inter-link interference: A signal transmitted between base stations or heterogeneous base stations (Picocell, femtocell, relay node) in HetNet situation is received by an Rx antenna of another base station, thereby working as interference.

Intra-device self-interference (hereinafter referred to as self-interference (SI)) among these three types of interference may be interference that occurs only in the FDR system and greatly degrades performance of the FDR system.

Accordingly, in order to efficiently operate and manage the FDR system, the SI is the most serious problem to be solved first.

Figure 10:
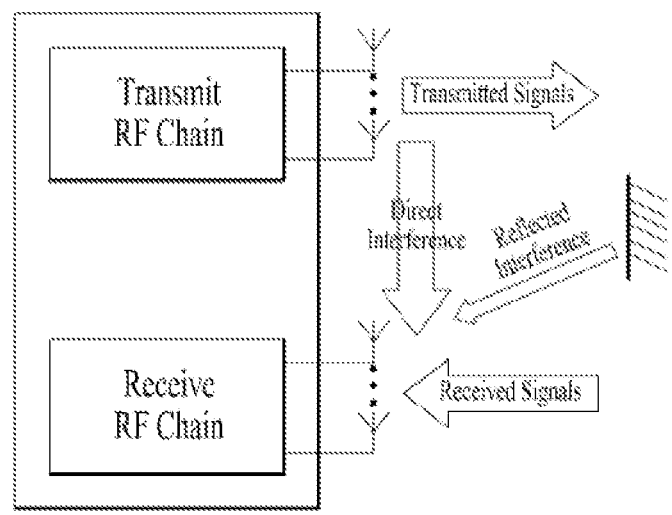
FIG. 10 is a conceptual diagram exemplarily showing Tx/Rx link and Self-Interference (SI) in FDR communication situation.

FIG. 10 is a conceptual diagram exemplarily showing Tx/Rx link and Self-Interference (SI) in FDR communication situation.

As shown in FIG. 10, Self-Interference (SI) may be categorized into direct interference that a signal transmitted from a Tx antenna directly enters an Rx antenna of its own without path attenuation and reflected interference that the signal is reflected by the surrounding terrain. And, a size of the SI is extremely larger than that of a desired signal due to a physical distance difference. Due to the intensity of the extremely large interference, effective cancellation of self-interference is required for the drive of FDR system.

In order to effectively drive the FDR system, requirements of Self-Interference Cancellation (Self-IC) according to maximum transmission power of a device may be determined as Table 5 (Self-IC requirements (BW=20 MHz) up FDR application in a mobile communication system).

TABLE 5

| Node Type | Max. Tx Power ($P_A$) | Thermal Noise. (BW = 20 MHz) | Receiver NF | Receiver Thermal Noise Level | Self-IC Target ($P_A$-TN-NF) |
|---|---|---|---|---|---|
| Macro eNB | 46 dBm | −101 dBm | 5 dB (for eNB) | −96 dBm | 142 dB |
| Pico eNB | 30 dBm | | | | 126 dB |
| Femto eNB, WLAN AP | 23 dBm | | | | 119 dB |
| UE | 23 dBm | | 9 dB(for UE) | −92 dBm | 115 dB |

Referring to Table 5, it can be observed that Self-IC performance of 119 dBm is necessary in order for a User Equipment (UE) to effectively drive an FDR system on a BandWidth (BW) of 20 MHz. A thermal noise value may change into $N_{D,BW}$=−174 dBm+10× $\log_{10}$(BW) depending on a bandwidth of a mobile communication system, and Table 7 was found on the assumption of a bandwidth of 20 MHz. Regarding Table 7, Receiver Noise Figure (NF) considers a worst case by referring to 3GPP specification requirements. A receiver thermal noise level is determined as a sum of ternmal noise and receiver NF on a specific BW. Types of Self-Interference Cancellation (Self-IC) Schemes and Application Methods FIG. 10 is a diagram showing positions for applying there kinds of interference schemes in an RF Tx/Rx stage (or RF from stage) of a device. In FIG. 10, application positions of three kinds of Self-IC schemes are illustrated. Hereinafter, the three kinds of Self-IC schemes are schematically described.

Antenna Self-IC: a Self-IC scheme supposed to be executed most preferentially among all Self-IC schemes is an antenna Self-IC scheme. SI cancellation is performed in an antenna stage. Most simply, a portion of an SI signal can be cancelled in a manner of physically cutting off a transfer of the SI signal by installing an object capable of cutting off a signal between a Tx antenna and an Rx antenna, artificially adjusting an inter-antenna distance by utilizing multiple antennas, or giving phase inversion to a specific Tx signal. Moreover, a portion of an SI signal may be cancelled by utilizing multiple polarized antennas or a directional antenna.

Analog Self-IC: This is a scheme of cancelling an SI signal using an analog signal copied by a scheme of cancelling interference in an analog stage before a received signal passes through Analog-to-Digital Converter (ADC). This may be performed in an RF or IF region. A method of cancelling an SI signal is described in detail as follows. First of all, a copy signal of an actually received SI signal is generated in a manner of time-delaying a transmitted analog signal and then adjusting an amplitude and phase of the signal and then subtracted from a signal received through an RX antenna. Yet, since it is processed using the analog signal, additional distortion may occur due to implementation complexity and circuit characteristics, which is disadvantageous in that interference cancellation performance may be changed considerably.

Digital Self-IC: This is a scheme of cancelling interference after a received signal has passed through ADC and includes all interference cancellation schemes performed in a baseband region. Most simply, it can be implemented in a manner of making a copy signal of SI using a transmitted digital signal and then subtracting it from a received digital signal. Alternatively, schemes for preventing a transmitted signal of a UE or BS from being received through an Rx antenna in a manner of performing precoding/postcoding on a baseband using multiple antennas may be classified as Digital Self-IC. However, Digital Self-IC is possible if a digitally modulated signal is quantized enough to reconstruct information on a desired signal. Thus, in order to perform Digital Self-IC, it is necessary to premise condition that a signal power level difference between an interference signal, which remains after cancelling interference using at least one of the above schemes, and a desired signal should enter an ADC range.

Figure 11:
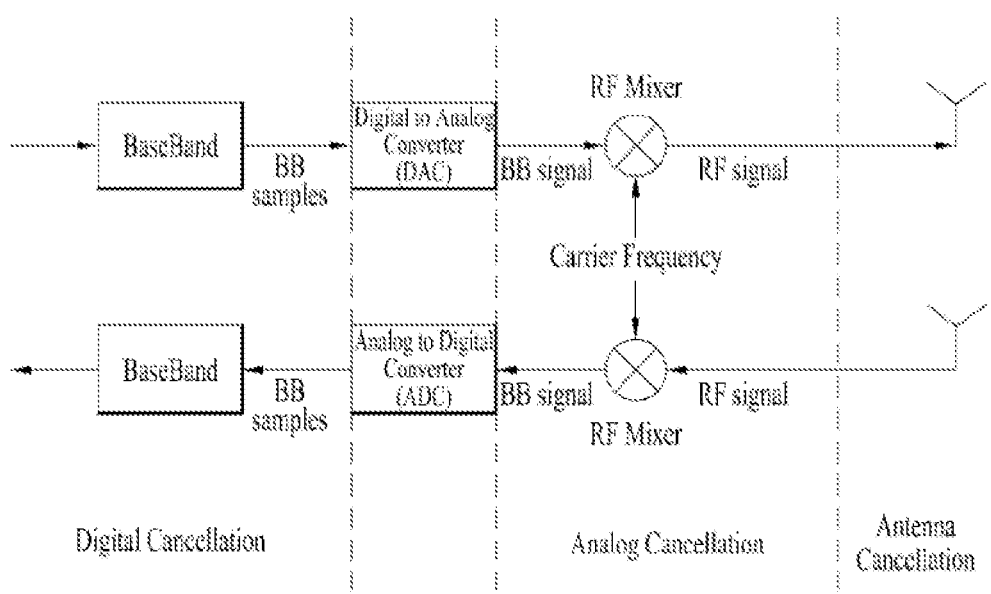
FIG. 11 is a diagram showing positions for applying there kinds of interference schemes in an RF Tx/Rx stage (or RF front end) of a device.
Figure 12:
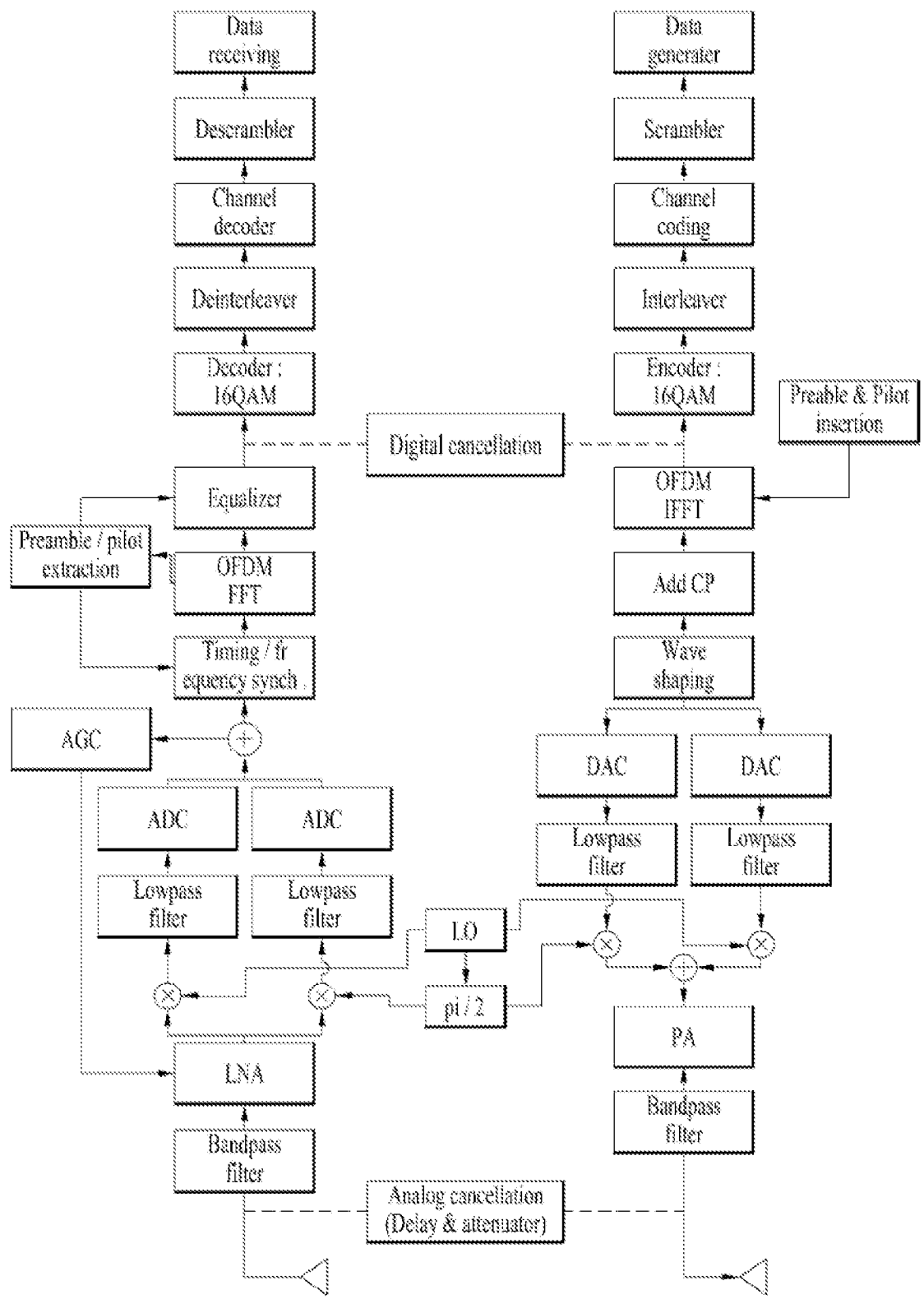
FIG. 12 is a block diagram diagrammatizing a device for Self-Interference Clearance (Self-IC) in a communication device proposed in a communication system environment using OFDM based on FIG. 11.

FIG. 12 is a block diagram diagrammatizing a device for Self-Interference Cancellation (Self-IC) in a communication device proposed in a communication system environment using OFDM based on FIG. 11.

Figure 15:
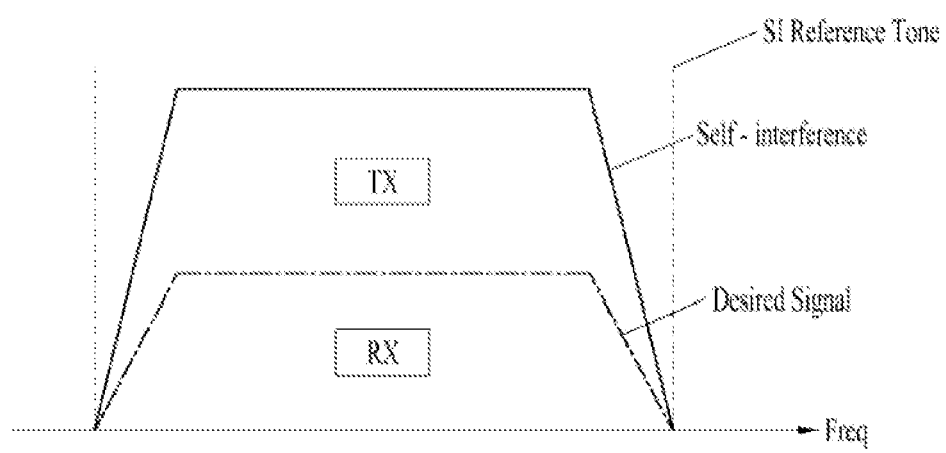
FIG. 15 is a diagram exemplarily showing two tones transmitted on both communication band sides to control a self-interference reference signal generator.

Regarding a location of a Digital Self-IC block, although FIG. 12 shows that it is performed directly using digital SI signal information before DAC and digital SI signal information after ADC, it may be performed using a digital SI signal after IFFT and a digital SI signal before FFT. In addition, although FIG. 15 is the conceptual diagram showing that a SI signal is cancelled by separating a Tx antenna and an Rx antenna from each other, antenna configuration may be different that of FIG. 15 in case of using an antenna interference cancellation scheme using a single antenna.

Signal Modeling of FDR System

Since the FDR system uses the same frequency between the transmission (Tx) signal and the reception (Rx) signal, non-linear components in RF may greatly affect the FDR system. Specifically, the Tx signals may be distorted by non-linear characteristics of active elements such as a power amplifier (PA) of the Tx RF chain and a low noise amplifier (LNA) of the Rx RF chain, and may also be distorted by a mixer for use in the Tx/Rx RF chains. Tx signals generated by such distortion can be modeled as signals caused by high-order components. Since even-order components affects a high frequency region corresponding to several times the peripheral and intermediate (center) frequencies of the DC, the even-order components can be effectively removed using the legacy AC coupling or filtering method. However, since odd-order components are generated adjacent to the legacy intermediate frequency, they cannot be easily removed unlike even-order components. As a result, the received odd-order components may greatly affect system performance. Considering the non linear characteristics of the odd-order components, the reception (Rx) signal to be received after the ADC of the FDR system can be expressed by the following equation 1 according to the Parallel Hammerstein (PH) model.

$$y(n) = h_D(n) * x_D(n) + \sum_{\substack{k=1,\ldots,K \\ k=odd}} h_{SI,k}(n) * |x_{SI}(n)|^{k-1} x_{SI}(n) + z(n), \quad \text{[Equation 1]}$$

In Equation 1, $x_D(n)$ is data to be received, $h_D(n)$ is a data channel experienced by the data to be received, $x_{SI}(n)$ is data that was transmitted from the system, $h_{SI,K}(n)$ is a self-channel experienced by the data that was transmitted from the system, wherein, if k is '1', this means linear components, if k is an odd value of 3 or more, this means non-linear components, and 'z(n)' is Additive White Gaussian Noise (AWGN).

For the above-described analog or digital self-IC, it is necessary to estimate the self-channel. At this time, the received signal after performing the self-IC using the estimated gain of the analog or digital self-channel can be represented by the following equation 2.

$$y_{self-IC}(n) = h_D(n) * x_D(n) + \underbrace{\sum_{\substack{k=1,\ldots,K \\ k=odd}} \left(h_{SI,k}(n) - \hat{h}_{SI,k}(n)\right) * |x_{SI}(n)|^{k-1} x_{SI}(n) + z(n)}_{\text{Residual SI}}, \quad \text{[Equation 2]}$$

Now, when the received signal is decoded using the estimated gain $\hat{h}_D(n)$ of the estimated desired channel, the decoded result of the received signal can be represented by the following equation 3.

$$\frac{\hat{h}_D^*(n) y_{Self-IC}(n)}{|\hat{h}_D^*(n)|^2} = \frac{\hat{h}_D^*(n) * h_D(n)}{|\hat{h}_D^*(n)|^2} x_D(n) + \frac{\hat{h}_D^*(n) * z'(n)}{|\hat{h}_D^*(n)|^2} = \quad \text{[Equation 3]}$$

$$x_D(n) + \frac{\hat{h}_D^*(n) * e(n)}{|\hat{h}_D^*(n)|^2} + \frac{\hat{h}_D^*(n) * z'(n)}{|\hat{h}_D^*(n)|^2}$$

In Equation 3, z'(n) is denoted by $$z'(n) = \sum_{\substack{k=1,\ldots,K \\ k=odd}} \left(h_{SI,k}(n) - \hat{h}_{SI,k}(n)\right) * |x_{SI}(n)|^{k-1} x_{SI}(n) + z(n),$$

and e(n) is denoted by $e(n) = h_D(n) - \hat{h}_D(n)$

Figure 13:
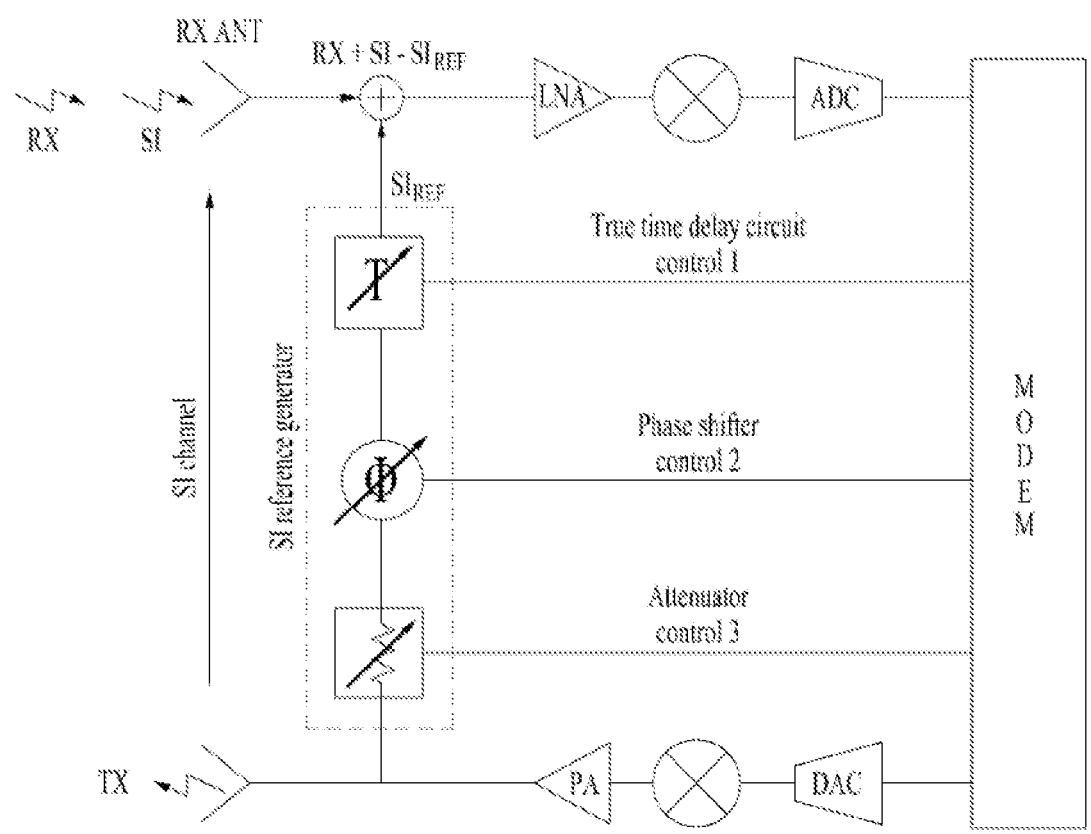
FIG. 13 is a diagram showing an RF chain of a communication device for performing general Full Duplex Radio (FDR) technology.

FIG. 13 is a diagram showing an RF chain of a communication device for performing general Full Duplex Radio (FDR) technology.

In order to cancel an SI signal in a communication device using FDR, it is necessary to generate a copy signal (hereinafter, SI interference signal) exactly identical to the SI signal. Referring to FIG. 3, for the cancellation of an SI signal, a method of subtracting an SI reference signal SIREF from an SI signal (SI) before LNA of an Rx stage of an RX chain is used in general. In this case, in order to generate the SI reference signal SIREF in the communication device, a Tx signal of a Tx stage is diverged (e.g., a case of diversion after PA in the Tx stage is shown in FIG. 3) and a portion of the Tx signal is then set to pass through an SI reference generator including an attenuator, a phase shifter and a true time delay circuit. The SI reference generator generates an SI reference signal to imitate an SI channel using the diverged Tx signal. In doing so, in order for the SI reference generator to imitate the SI channel, a channel into which the SI signal is put is estimated separately.

The communication device may estimate the SI channel and then generate a control signal inputted to the true time delay circuit, a control signal inputted to the phase shifter, and a control signal inputted to the attenuator. In this case, an SI reference signal path and a desired Rx signal should be in a state of not coming in entirely.

As a method for a communication device to control an SI reference generator, there may be two kinds of methods.

According to a first method, in order to separately estimate an SI signal incoming channel, a communication device stops communication and transmits an SI channel estimation signal (e.g., pilot signal, reference signal, etc.) on an allocated communication band (or a channel band) and an SI reference generator may imitate an SI signal upon communication using information of the SI channel estimation signal.

According to a second method, a communication device may transmit an SI signal channel estimation signal (e.g., reference signal, pilot signal, tone, etc.) carried on both ends (e.g., guard band) of a communication channel band and control an SI reference generator in a direction that the corresponding SI signal channel estimation signal is reduced according to an adaptive feedback algorithm.

In the first method, to find an optimized state of the SI reference generator, it is necessary to estimate an SI channel. To this end, a Tx device (or a Tx side) and an Rx device (or an Rx side) should stop communication as well. Moreover, even though perfect SI channel estimation is performed, it is necessary to calibrate a channel of an SI reference path very precisely. The channel of the SI reference path needs to become a lookup table based on the combination of all control voltages. Although an accurate lookup table is written with specific Tx power and temperature, it is supposed to change depending on an original Tx power and a temperature of circuit. Hence, SI signal cancellation performance is inevitably degraded due to a difference between a current Tx power and temperature and a condition at the timing of preparing the lookup table. Moreover, there is a disadvantage that it is unable to follow an SI signal channel (or an SI channel) that changes depending on a time.

Regarding the second method, as a communication device can transmit an SI signal channel estimation signal (tone, pilot signal, reference signal, etc.) carried on both communication band sides without stopping communication and controls an SI reference generator time-continuously using adaptive feedback algorithm, calibration of the SI reference generator is unnecessary. However, as the SI reference generator is controlled using a tone of a guard band on both communication band sides instead of a communication band, it is disadvantageous in that an SI signal attributed to a transmission of a tone inside the communication band, which is most important, is not cancelled.

Figure 14:
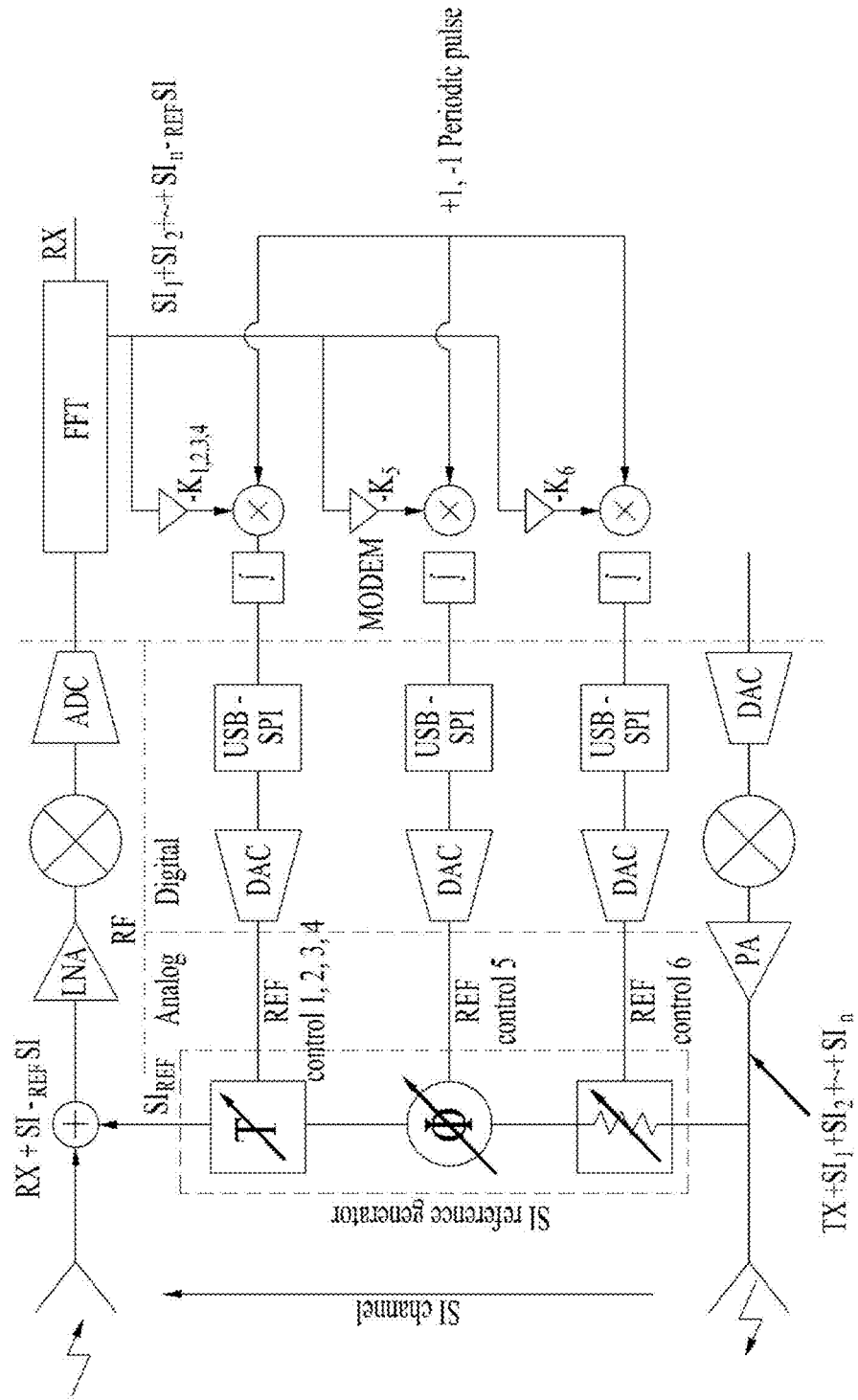
FIG. 14 is a diagram showing one example of an RF chain structure of a communication device for self-interference signal cancellation in using FDR

FIG. 14 is a diagram showing one example of an RF chain structure of a communication device for self-interference signal cancellation in using FDR.

Referring to FIG. 14, an RF chain of a communication device may include a communication modem (or a modem), an SI reference generator, a transmission (Tx) antenna, a reception (Rx) antenna, etc. The communication modem may include a Fast Fourier Transform (FFT) unit and integrators. The SI reference generator may include an attenuator, a phase shifter, and a true time delay circuit.

To generate (or copy) a fine SI reference signal, the SI reference generator may control the attenuator, the phase shifter and the true time delay circuit using an analog manner. To this end, the RF chain may include a Digital to Analog Convener (DAC) configured to convert a control signal transmitted from the communication modem (or modem) into an analog signal.

According to the concept of the true time delay circuit (true time delay) defined as a slope of phase shift to frequency band basically, as it is unable to control a true time delay with information on a single frequency only, it is necessary to obtain information on at least two frequencies in order to perform SI signal cancellation on a wide band. Therefore, it is assumed to transmit two or more pilot signals, two or more reference signals, two or more tones, or the like, which are test signals.

In order to control the SI reference generator, how to use multiple reference signals (or, multiple tones, multiple pilot signals, etc.), which are test signals, is described. First of all, the communication model (or modem) shown in FIG. 13 may monitor a sum of powers of multiple tones at the frequencies where the multiple tones are located as test signals, measure the powers at the frequency positions where the multiple tones are transmitted, respectively, and then calculate the sum of the measured powers. Here, the power measured at the frequency position of the transmitted tone corresponds to the power of the SI signal.

The communication modem may transmit a control signal to minimize a difference between the power sum of SI signals attributed to multiple tones and the power of an SI reference signal. Namely, the communication modem may feed a control signal, which is to minimize the sum of the powers of the SI signals attributed to the multiple tones, back to the SI reference generator. The SI reference generator generates an SI reference signal according to the feedback control signal. To cancel the measured power sum of the SI signals, the communication modem may generate an SI reference signal having a power of a value closest to the power sum.

The communication modem may control the SI reference generator until the power sum (SI=SI1+SI2+SI3+ . . . +SIn) is minimized using the adaptive feedback loop. Here. Sin is a power of an SI signal measured at a frequency position where an nth reference signal among a plurality of reference signals is transmitted. The communication modem uses a periodic pulse signal of +1 and −1 to change a sign of an increment of a bias voltage controlled by a loop function of adaptive feedback. The loop function means a function for searching surroundings of a current variable in a feedback loop including a variable to control.

The communication modem may feed a control signal back to each of the phase shifter, the attenuator and the true time delay circuit using an adaptive feedback loop so as to enable the SI reference generator to generate an SI reference signal having a power closest to a power sum of SI signals.

As a method of controlling SI reference signal generation according to FIG. 14 operates adaptive feedback algorithm with the power sum of multiple tones, it is advantageous in that complicated channel estimation, calibration and the like are unnecessary.

FIG. 15 is a diagram exemplarily showing two tones transmitted on both communication band sides (e.g., guard bands) to control a self-interference (SI) reference signal generator.

Referring to FIG. 15, an SI reference generator may be controlled in such a way that a (guard band) SI signal channel estimation tone is included at both ends of a communication channel band and the corresponding estimation tone is reduced according to an adaptive feedback algorithm. In this case, a desired signal from which self-interference (SI) was removed can be stably received by the system.

Figure 16:
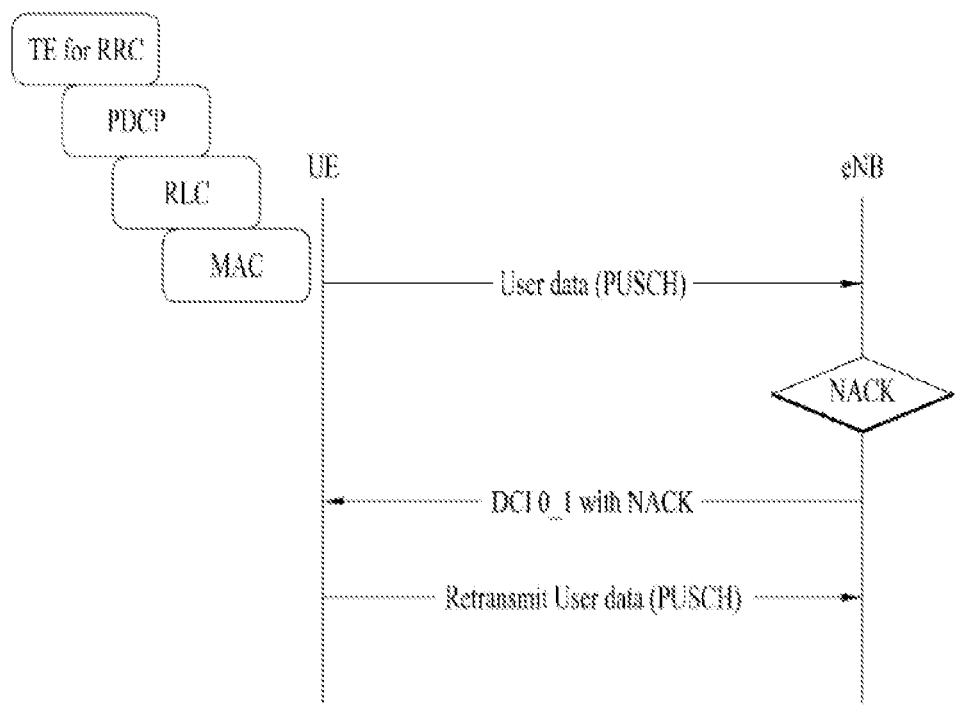
FIG. 16 is a flowchart illustrating a basic process of an uplink HARQ to which the present disclosure can be applied.

1) (Basic procedure of Incremental Redundancy(IR)-HARQ for uplink based on NACK signaling of gNB FIG. 16 is a flowchart illustrating a basic process of an uplink HARQ to which the present disclosure can be applied. Upon receiving UL data, the base station (BS) performs the decoding procedure. In this case, if the data decoding fails, the BS transmits a NACK to the UE through a PDCCH to request retransmission based on the HARQ procedure. The basic procedure is shown in FIG. 16.

After resources for uplink are allocated from the gNB, the UE may transmit a PUSCH. The BS (gNB) may decode the received PUSCH, and may determine ACK/NACK through a CRC value through rate matching with the OFDM decoder. DCI may be set through the determined ACK/NACK, and DCI parameters related to HARQ may include a New Data Indicator (NDI) and a HARQ process number. If there occurs a PUSCH ACK, 'NDI=1' is set and the sum of the previously sent HARQ process number and the value of 1 is then transmitted. If there occurs a PUSCH NACK, 'NDI=0' is set and the previous HARQ process number is then transmitted as DCI, so that PUSCH retransmission is performed.

2) Basic procedure of 1R-HARQ for downlink based on NACK signaling from UE

Figure 17:
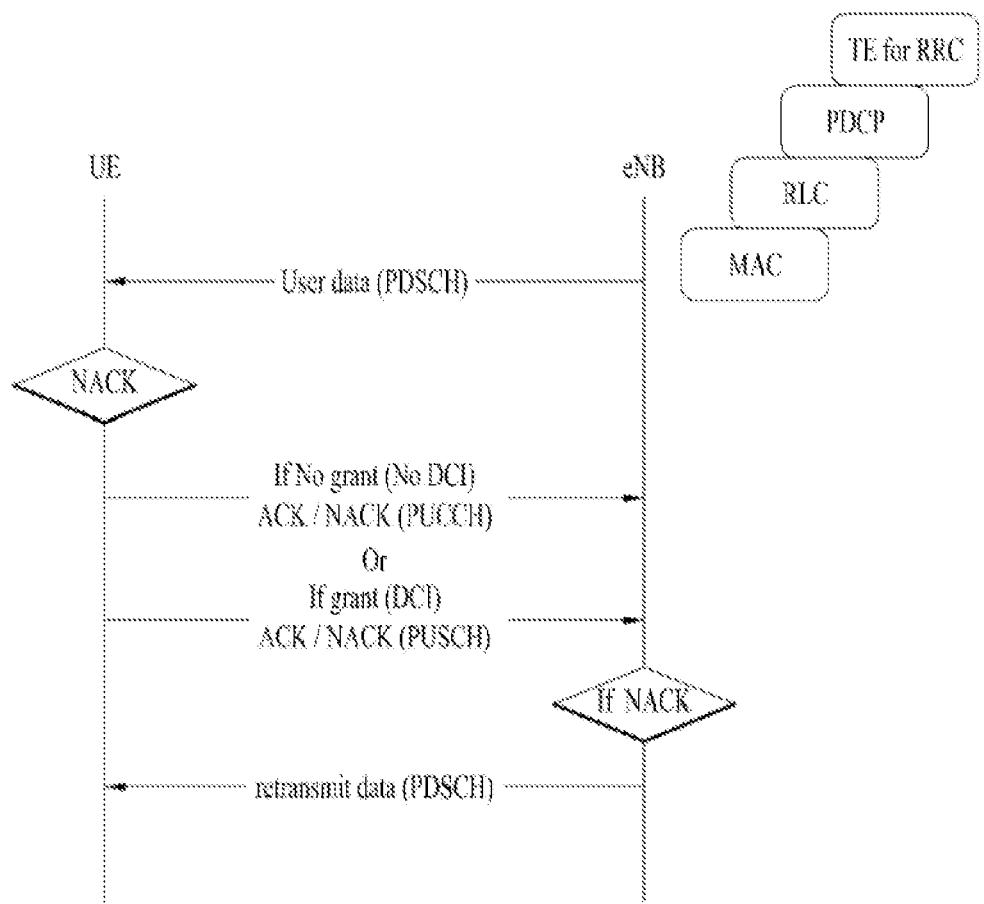
FIG. 17 is a flowchart illustrating a basic process of a downlink HARQ to which the present disclosure can be applied.

FIG. 17 shows a basic process of downlink HARQ to which this present document can be applied. After the UE receives downlink data, the UE performs a decoding procedure. In this case, if the data decoding fails, the UE transmits a NACK through PUCCH or PUSCH to the base station (BS) to request retransmission based on the HARQ procedure. The basic process is shown in FIG. 17.

Unlike the uplink HARQ, in the downlink HARQ, the UE has no information about the HARQ procedure. However, the UE may obtain information (Process ID, RV value) included in DCI on a PDCCH transmitted from the BS, and may perform decoding based on the retransmitted PDSCH data.

Figure 18:
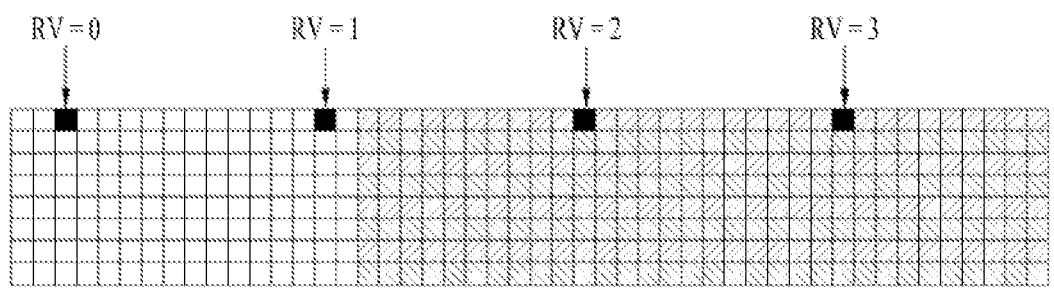
FIG. 18 is a diagram illustrating a structure of a cyclic buffer for a rate matching module for use in a 5G system to which the present disclosure can be applied.

FIG. 18 is a diagram illustrating a structure of a cyclic buffer for a rate matching module for use in the 5G system to which the present disclosure can be applied.

When data retransmission is performed in the current LTE-based system, the RV value of the encoded signal is changed in the order of 0→2→1→3 through rate matching with the OFDM encoder as shown in FIG. 18, and is then transmitted. When data retransmission is performed using the cyclic buffer as shown in the figure below, a part of the existing encoded signal can be reused and retransmitted without creating an additional encoded signal.

3) Cause of Decoding Failure of FDR UE

Figure 19:
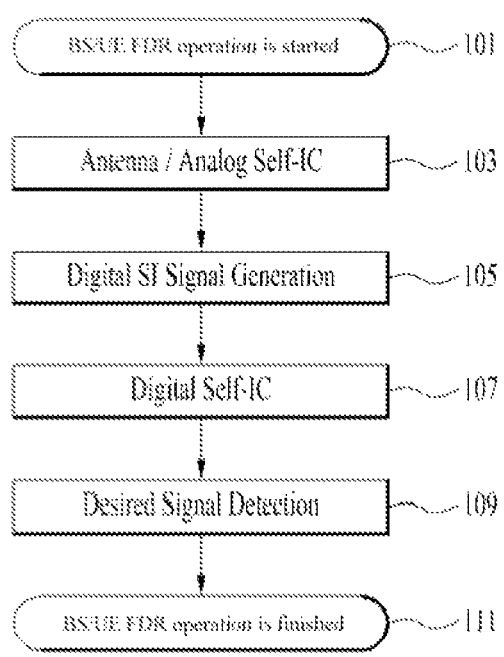
FIG. 19 is a flowchart illustrating a method for performing a self-IC operation technique for use in the FDR operation to which the present disclosure can be applied.

FIG. 19 is a flowchart illustrating a method for performing a self-IC operation technique for use in the FDR operation to which the present disclosure can be applied.

The existing legacy UE may fail to decode a downlink signal due to channel quality of a downlink channel or other cell/UE interference. In contrast, in the FDR UE, decoding may be successful due to appropriate self-interference cancellation (self-IC) performance. In the FDR system, the procedure for operating the existing self-IC operation/management may create the signal as shown in Equation 1. Now, the SI signal may be obtained by generating a digital SI signal from the signal of Equation 1, and digital self-IC may be performed based on the obtained signal, so that the signal shown in Equation 2 can be obtained. Next, after a desired signal sensing block performs signal decoding as shown in FIG. 19, all processes are finished.

Meanwhile, as described above, the detection performance of the received (Rx) signal is greatly affected by the accuracy of the estimated self-channel ($h_D(n)$) and the desired channel ($\hat{h}_D(n)$). Therefore, success or failure of self-IC may be determined based on the result of success/failure of detection of the final received (Rx) signal. Table 6 refers to a table prepared based on the correlation between the success/failure of detection of the received signal and the success/failure of self-IC, and a detailed description thereof is as follows.

TABLE 6

|  | Self-IC success | Self-IC failure |
| --- | --- | --- |
| Rx signal detection success | Case 1 | None |
| Rx signal detection failure | Case 2 | Case 3 |

In Case 1, reception of the desired signal is successful after digital self-IC is established. In Case 2, despite the success of digital self-IC, the desired channel estimation is incorrect, a link quality is poor, or detection of the received (Rx) signal has failed due to other cell/UE interference. In Case 3, detection of the received (Rx) signal failed due to self-IC failure. When self-IC has failed, the SI signal was unbearably strong in signal intensity compared to the Rx signal, so that it was determined that detection of the Rx signal would not be successful because of a very high intensity of the SI signal.

A basis for determining whether the self-IC has failed may include the following examples 1 to 3.

1. In Example 1, after ADC processing is completed, a difference between several consecutive samples is less than or equal to '0'.
2. In Example 2, EVM in the demodulation stage greatly deviates from a constellation point.
3. In Example 3, a signal obtained by error correction code (ECC) decoding has higher similarity with the SI signal acting as a known signal.

In addition to the above judgment examples, other bases capable of appropriately determining whether self-IC failed can also be used as needed.

4) Problems in the existing IR-HARQ procedure when decoding fails due to the self-IC failure of the FDR UE As described above, the base station (BS) may determine the IR-HARQ procedure for downlink only based on NACK information of the UE, and may thus perform retransmission based on the result of determination. However, the BS is unable to recognize why NACK was generated in the UE. In particular, when NACK occurs in the FDR operation of the UE supporting FDR, a recovery success rate obtained when the retransmission signal is received may be changed according to whether the SIC was successful or failed as described above. To solve this problem, the present disclosure can be supplemented with the patent document entitled "Apparatus and Methods of Signaling with SIC Success Flag for HARQ Procedure with Full Duplex Operation [3]".

In the present document, when the UE feeds back the NACK after recognizing failure of downlink signal decoding caused by the channel quality or other cell/UE interference and failure of signal decoding caused by performance of self-interference control, the UE transmits a flag indicating a failure reason to a node in a manner that the node can recognize why the NACK has occurred, so that the node can provide a configuration according to characteristics appropriate for the NACK reason.

Figure 20:
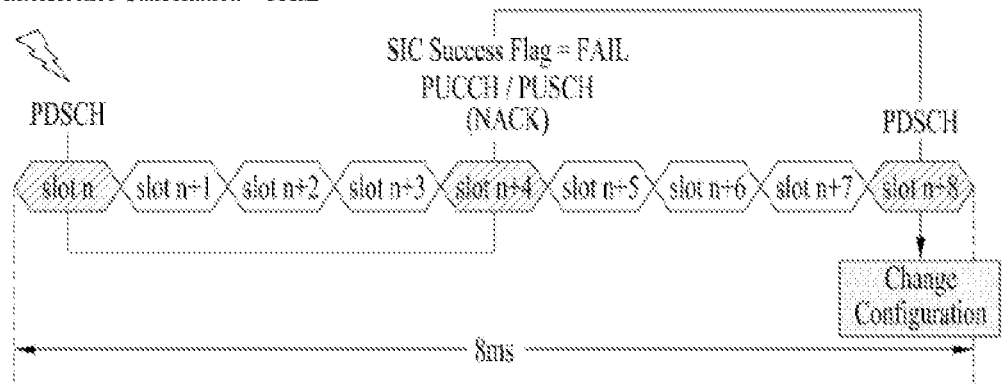
FIG. 20 is a diagram illustrating a HARQ process using a self-IC (SIC) success flag in an LTE system.

5) Problems encountered in controlling the IR-HARQ procedure by transmitting the SIC success flag to the node when decoding has failed due to the self-IC failure of the previously proposed FDR UE FIG. 20 is a diagram illustrating a HARQ process using the self-IC (SIC) success flag in the LTE system.

The corresponding concept can also be equally applied to the 5G NR system, but there are the following problems.

In the LTE system, the HARQ feedback timing (k) is set to 4 slots, and the subcarrier spacing (Δf) is set to 15 kHz In the HARQ procedure using the previously proposed SIC success flag, a total of 8 slots (8 ms) is required, until the UE transmits the SIC success flag on PUCCH/PUSCH upon receiving a PDSCH and the BS then recognizes the SIC success flag and finally applies the changed configured information to the UE as shown in FIG. 20.

Figure 21:
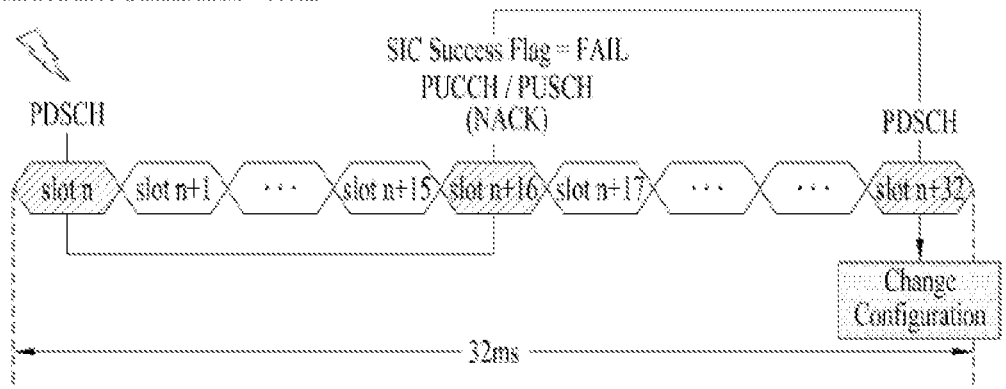
FIG. 21 is a diagram illustrating a HARQ process using the SIC success flag when SCS (Subcarrier Spacing) is set to 240 (i.e., SCS=240) in the 5G NR system.

FIG. 21 is a diagram illustrating a HARQ process using the SIC success flag when SCS (Subcarrier Spacing) is set to 240 (i.e., SCS=240) in the 5G NR system.

On the other hand, the 5G NR system has various numerologies with the subcarrier spacing (Δf) from 15 kHz to 240 kHz. In the 5G NR system, the time for each numerology corresponding to 16 slots indicating a maximum HARQ feedback timing (k) is shown in Table 7 below. In the HARQ procedure using the SIC success flag as shown in FIG. 21, a maximum of 32 slots (32 ms) is required, until the UE transmits the SIC success flag on PUCCH/PUSCH upon receiving a PDSCH and the BS then recognizes the SIC success flag and finally applies the changed configured information to the UE.

TABLE 7

| Subcarrier spacing (Δf)[kHz] | Number of slots per frame (10 ms) | Max HARQ feedback timing (16 slots) [ms] |
| --- | --- | --- |
| 15 | 10 | 16 |
| 30 | 20 | 8 |
| 60 | 40 | 4 |
| 120 | 80 | 2 |
| 240 | 160 | 1 |

In spite of the self-IC failure, in is performed between the UE and the BS according to the existing HARQ procedure, a lot of time is consumed until a new configuration is applied to the UE in the system having a large HARQ RTT delay, so that UE performance may be degraded. In order to address this issue, there is a need to reduce the time taken for the new configuration.

In order to solve the above problems, the present document proposes the following technique.

In the FDR system configured to use a single frequency transmission band, the problem caused by self-interference can occur more easily than in a half-duplex mode system. As a result, UE performance may be degraded, so that the following technology can be proposed.

The UE operating in the full-duplex mode monitors the self-interference cancellation (SIC) result for each slot and transmits the monitoring result to the BS, so that the BS can quickly apply a configuration suitable for this situation, thereby increasing UE performance. The BS having received the above monitoring result may determine the duplex mode, the MCS level and transmission (Tx) power, the data allocation, the HARQ scheme, etc. by referring to the UE status based on the uplink power headroom report (PHR) and the buffer status report (BSR), and may apply the determined information to the reconfiguration or the HARQ procedure, thereby increasing UE performance.

Figure 22:
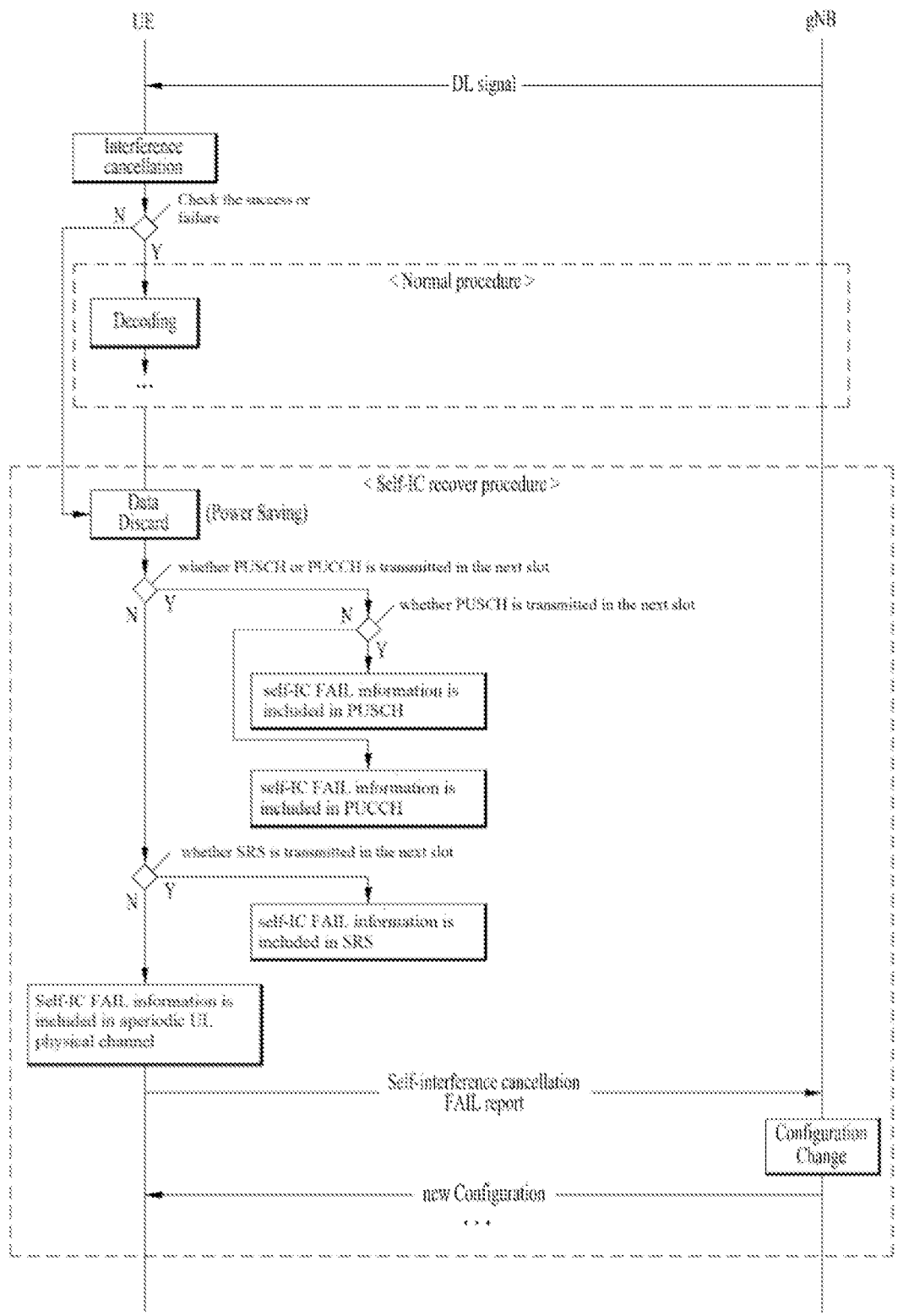
FIG. 22 is a flowchart illustrating a self-interference report procedure of the UE to which the present disclosure can be applied.

FIG. 22 is a flowchart illustrating a self-interference report procedure of the UE to which the present disclosure can be applied.

If there is a physical channel received through the downlink, the UE performs self-IC. If failure is decided, the UE carries information through the nearest uplink physical channel. If the BS receives this information, the BS can recognize the self-IC status of the current UE. At this time, the BS can recognize that UE performance is not good, so that the BS may immediately change the channel configuration to another, resulting in increased UE performance.

Figure 23:
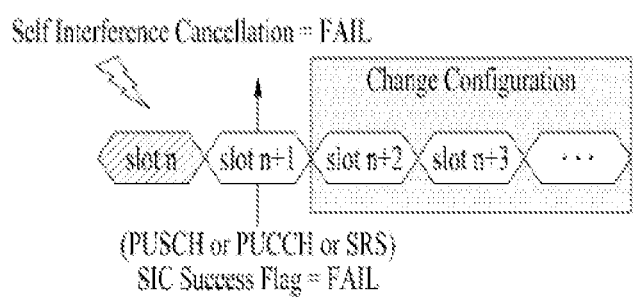
FIG. 23 is a diagram illustrating an example of a method for applying a self-interference report procedure to which the present disclosure can be applied.

FIG. 23 is a diagram illustrating an example of a method for applying a self-interference report procedure to which the present disclosure can be applied.

FIG. 23 is a scenario in which the proposed self-interference (SI) report procedure is applied. When the UE fails in self-IC at the slot (n), the UE may inform the BS of the failure through an uplink channel that is transmitted at the slot (n+1), and the BS can enable the UE to operate with the changed configuration at the slot (n+2). In this case, after lapse of a minimum of 2 slots, switching to a configuration suitable for the new environment can be performed, and this resultant configuration can be applied more quickly than the existing 32 slots, resulting in increased UE performance.

<Proposal 1> In Proposal 1, if self-IC failure occurs in the current slot, the uplink physical channel to be sent to the next slot is set to a PUCCH (Physical Uplink Control Channel).

The UE may attempt to perform self-IC for each slot. If the UE has failed in the self-IC and a physical channel to be sent to the next slot is a PUCCH, 1 bit from among the reserved bits may be allocated as a transmission bit (e.g., 0: success. 1: fail) indicating whether the SIC was successful or failed, and the resultant 1 bit serving as the transmission bit is then transmitted.

After the BS receives the PUCCH, the BS may first check the bit indicating success or failure of the SIC. If the successful SIC is decided, the BS may determine the remaining bits as UC1. If the SIC failure is decided, the BS may control the UE to change a channel configuration to another.

<Proposal 2> In Proposal 2, the uplink physical channel to be transmitted to the next slot when the self-IC failure occurs in the current slot is a PUSCH (Physical Uplink Control Channel).

The UE may attempt to perform the self-IC for each slot. If the UE fails in the self-IC and the physical channel to be sent to the next slot is a PUSCH, 1 bit of the UL-SCH may be allocated as a transmission bit (e.g., 0: success. 1: fail) indicating whether the SIC was successful or failed, and the resultant 1 bit serving as the transmission bit is then transmitted.

After the BS receives the PUSCH and performs the decoding process, the BS may first check the bit indicating success or failure of the SIC. If the successful SIC is decided, the BS may determine the remaining bits to be predetermined information. If the SIC failure is decided, the BS may control the UE to change a channel configuration to another.

<Proposal 3> In Proposal 3, the uplink physical channel to be transmitted to the next slot when the self-IC failure occurs in the current slot is set to SRS (Sounding Reference Signal).

The UE attempts to perform the self-IC for each slot. If the self-IC failure is decided and the physical channel to be sent to the next slot is set to the SRS, the UE may fix a cyclic shift (CS) value (n_cs) indicating a 'transmissionComb' value of the upper layer to zero '0' and may then transmit the fixed CS value (n_cs) of zero '0'.

After the BS receives the SRS and performs the decoding process, if the CS value (n_cs) indicating the 'transmissionComb' value is set to zero '0', the BS may control the UE to change a channel configuration to another.

<Proposal 4> In Proposal 4, if the self-IC failure occurs in the current slot, the uplink physical channel to be sent to the next slot does not exist.

The UE may attempt to perform the self-IC for each slot. When self-IC failure is decided and the physical channel to be sent to the next slot does not exist, the UE may transmit the bit indicating the success or failure of the SIC through a physical channel corresponding to the earliest slot from among the uplink slot (e.g., UCI) transmitted by DCI and the other uplink slots (SR, CSI/PMI/RI, ACK/NACK, SRS) that are periodically transmitted. If the corresponding slot is set to the PUCCH, the procedure of Proposal 1 may be performed. If the corresponding slot is set to the PUSCH, the procedure of Proposal 2 may be performed. If the corresponding slot is the SRS, the procedure of Proposal 3 may be performed.

As described above, according to the present document, when self-interference occurs in the FDR environment, the time taken for the UE to report the self-IC failure to the BS is shortened so that a time taken for the BS to operate the UE with the new configuration is also shortened, resulting in increased UE performance.

Hereinafter, devices for performing the above-described proposed methods will be described in detail.

Communication System Example to which the Present Disclosure is Applied

Although not limited thereto, various descriptions, functions, procedures, proposals, methods, and/or operational flow charts of the present disclosure disclosed in this document can be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 24:
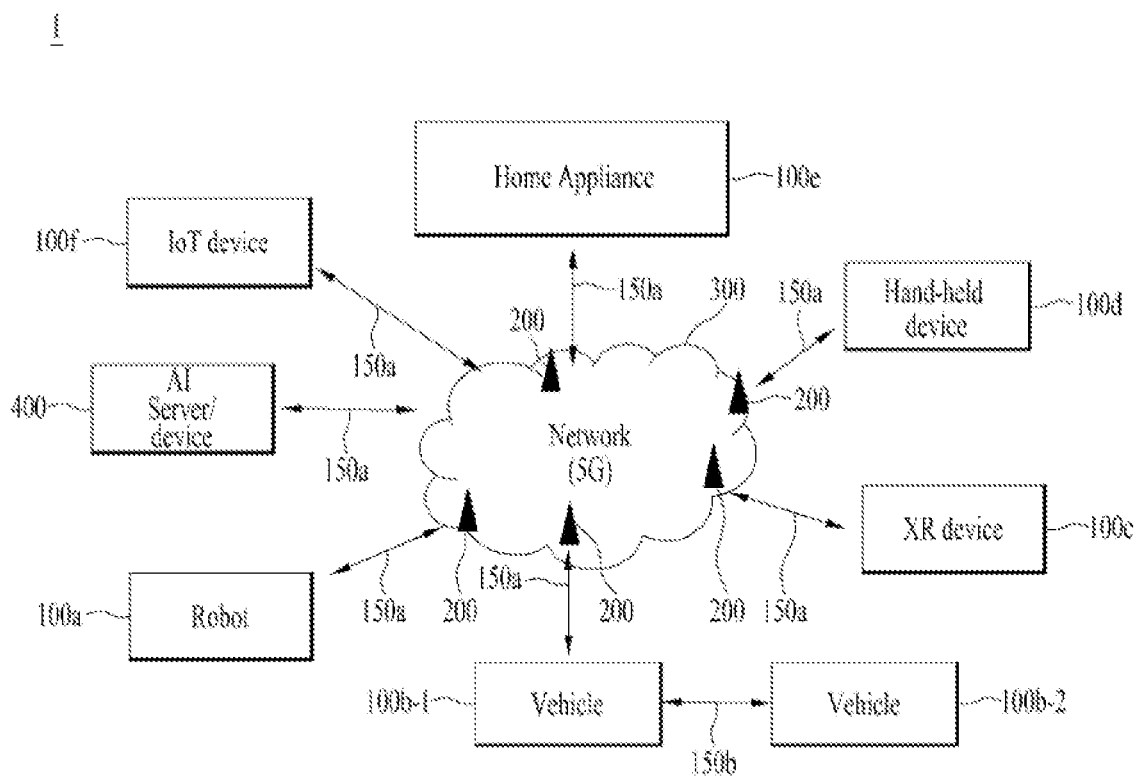
FIG. 24 illustrates a communication system applied to the present disclosure.

FIG. 24 illustrates a communication system applied to the present disclosure.

Referring to FIG. 24, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a borne appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 1001 may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 2110/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

Figure 25:
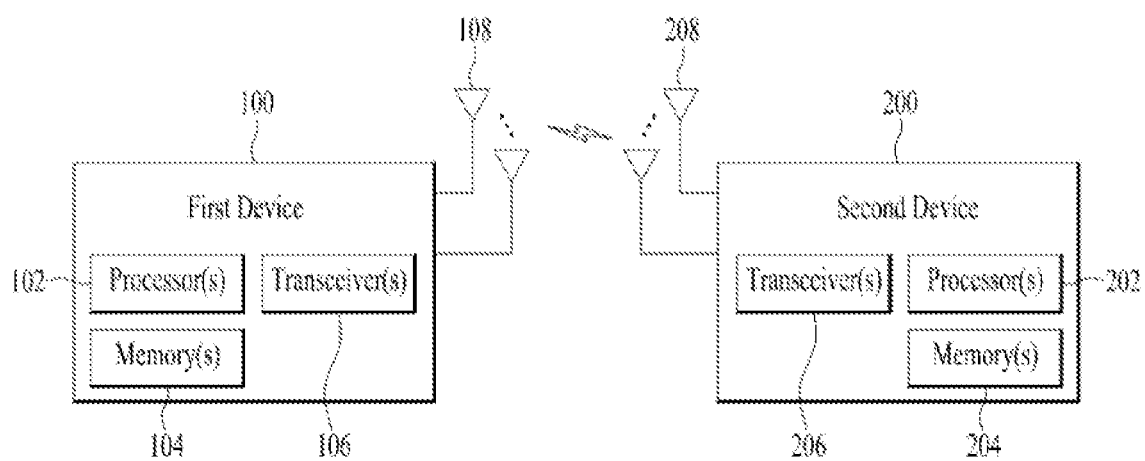
FIG. 25 illustrates wireless devices applicable to the present disclosure.

FIG. 25 illustrates a wireless device applicable to the present disclosure.

Referring to FIG. 25, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 19.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processors) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processors) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceivers) 106 may be interchangeably used with Radio Frequency (RF) unit(s). In the present disclosure, the wireless device may represent a communication modem/circuit/chip.

Specifically, the chipset may include the processor(s) 102 and memory(s) 104. The memory(s) 104 may include at least one program capable of performing operations related to the embodiments above described. The processor(s) 102 may receive allocation of resources related to FDR based on the at least one program stored in the memory(s) 104.

The processor(s) 102 may control the RF transceiver(s) to report SIC capability to a BS. The processor(s) 102 may control the RF transceiver(s) to receive resource allocation information on a predetermined time period divided into a first time resource period and a second time resource period from the BS. In this case, the first time resource period may be a time resource period allocated to simultaneously perform transmission of a UL signal and reception of a DL signal in the same frequency band, and the second time resource period may be a time resource period allocated to perform either the transmission of the UL signal or the reception of the DL signal. In addition, the first time resource period and the second time resource period may be determined based on the SIC capability, the amount of first data related to the UL signal, and the amount of second data related to the DL signal.

The second wireless device 200 may include one or more processors 202 and one or more memories 204 and additionally further include one or more transceivers 206 and/or one or more antennas 208. The processors) 202 may control the memory(s) 204 and/or the transceivers) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s)

204. The memory(s) 204 may be connected to the processor(s) 202 and may store a variety of information related to operations of the processor(s) 202. For example, the memory(s) 204 may store software code including commands for performing a pan or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

The processor(s) 202 of a BS may control the RF transceiver(s) to receive a report on SIC capability related to FDR from a UE. The processor(s) 202 may determine a first time resource period in which transmission of a UL signal and reception of a DL signal are simultaneously performed in the same frequency band for a predetermined time period and a second time resource period in which either the transmission of the UL signal or the reception of the DL signal is performed. The processor(s) 202 may control the RF transceiver(s) to transmit resource allocation information including information on the first time resource period and the second time resource period to the UE.

In another aspect of the present disclosure, there is provided a computer-readable storage medium having at least one computer program configured to cause at least one processor to perform operations. The operations may include: providing information on SIC capability to a BS; and receiving resource allocation information on a predetermined time period divided into a first time resource period and a second time resource period from the BS. In this case, the first time resource period may be a time resource period allocated to simultaneously perform transmission of a UL signal and reception of a DL signal in the same frequency band, and the second time resource period is a time resource period allocated to perform either the transmission of the UL signal or the reception of the DL signal. In addition, the first time resource period and the second time resource period may be determined based on the SIC capability, the amount of first data related to the UL signal, and the amount of second data related to the DL signal.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels. etc. processed using the one or more processors 102 and 202 from the base band signals into the RF band signals. To this end, the one or more transceivers 106 and 206 may include (analog) oscillators and/or filters.

Examples of Wireless Devices to which the Present Disclosure is Applied

Figure 26:
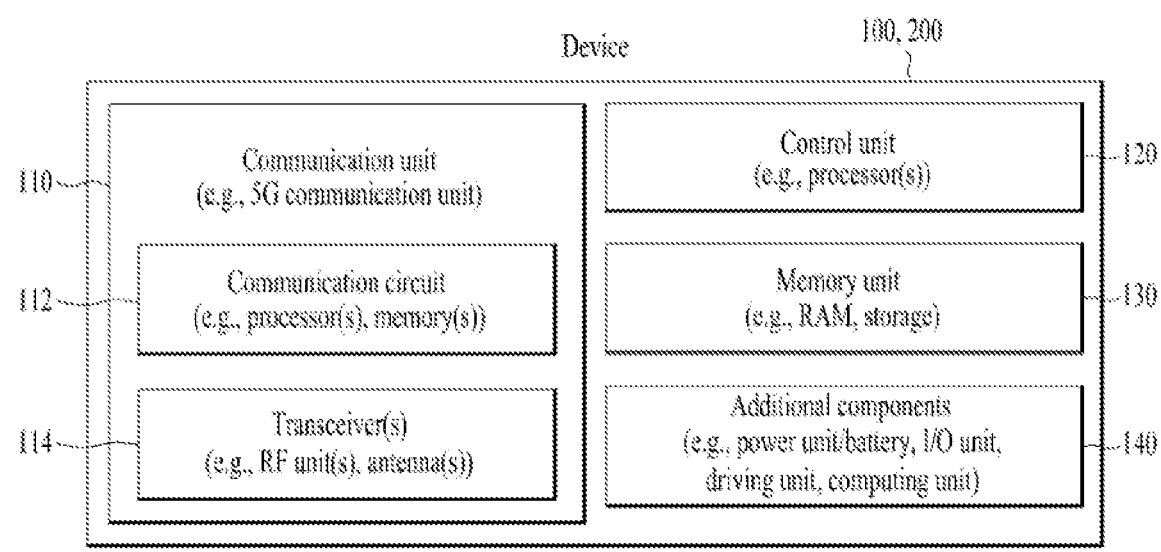
FIG. 26 illustrates another example of a wireless device to which the present disclosure is applied. The wireless device may be implemented in various forms according to use—examples/services.

FIG. 26 illustrates another example of a wireless device applied to the present disclosure. The wireless device may be implemented in various forms according to a use-case/service (refer to FIG. 24)

Referring to FIG. 26, wireless devices 100 and 200 may correspond to the wireless devices 100 and 200 of FIG. 24 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 24. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 22), the vehicles (100b-1 and 100b-2 of FIG. 22), the XR device (100c of FIG. 22), the hand held device (100d of FIG. 22), the home appliance (100e of FIG. 22), the IoT device (100f of FIG. 22), a digital broadcast terminal, a hologram device, a public safety device, an MTC device, a medicine device, a fintech device (or a finance device), a security device, a climate/environment device, the AI server/device (400 of FIG. 22), the BSs (200 of FIG. 22), a network node, etc. The wireless device may be used in a mobile or fixed place according to a use—example/service.

In FIG. 26, the entirety of the various elements, components, units/portions, and/or modules in the wireless devices 100 and 200 may be connected to each other through a wired interface or at least a pan thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 26 will be described in detail with reference to the drawings.

Examples of Mobile Devices to which the Present Disclosure is Applied

Figure 27:
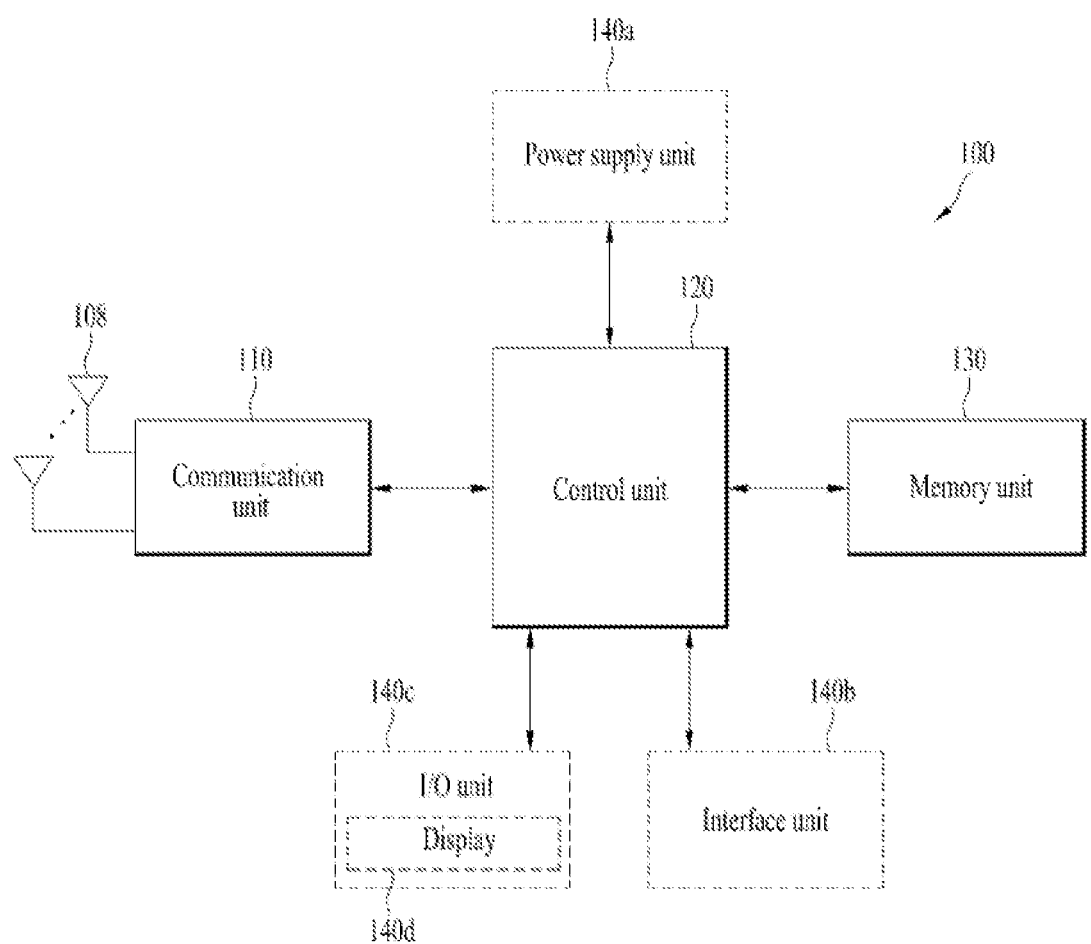
FIG. 27 illustrates a hand-held device applied to the present disclosure.

FIG. 27 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 27, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 21, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 28:
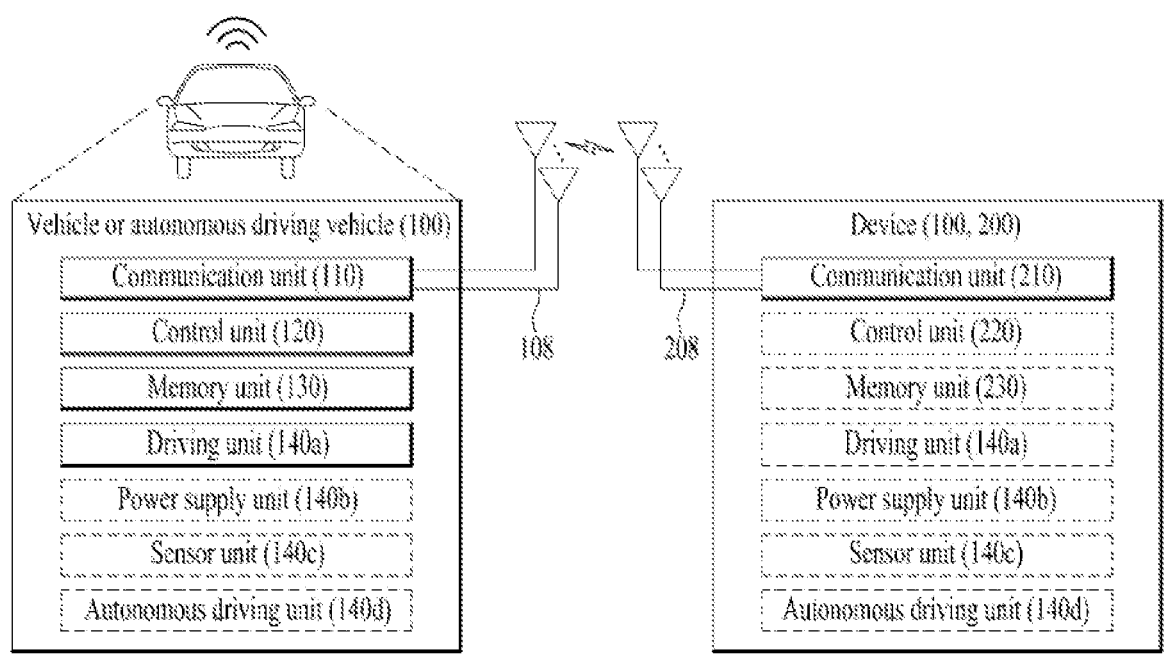
FIG. 28 illustrates a vehicle or an autonomous driving vehicle applied to the present disclosure.

Examples of Vehicles or Autonomous Vehicles to which the Present Disclosure is Applied FIG. 28 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 28, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a pan of the communication unit 110. The blocks 110/130/140a to 140d correspond to the blocks 110/130/140 of FIG. 23, respectively The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS). Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described embodiments of the present disclosure are applicable to various mobile communication systems.

The invention claimed is:

1. A method by a user equipment (UE) comprising:
receiving a first signal from a base station (BS) through a first slot;
transmitting, to the base station (BS), a second signal including hybrid automatic repeat and request acknowledgement/negative-acknowledgement (HARQ-ACK/NACK) feedback for the first signal; and
receiving, from the base station (BS), channel configuration information to change a channel configuration based on the second signal further including information on a failure of a self-interference cancellation related to the reception of the first signal,
wherein, based on the second signal being a sounding reference signal (SRS) transmitted in a second slot, the information on the failure of the self-interference cancellation is provided to the BS through a specific value of a cyclic shift (CS) for the SRS.

2. The method according to claim 1, wherein:
based on the second signal being a physical uplink control channel, the information on the failure of the self-interference cancellation is provided to the base station through a reserved bit of the physical uplink control channel.

3. The method according to claim 1, wherein:
based on the second signal being a physical uplink data channel, the information on the failure of the self-interference cancellation is provided to the base station through a header of the physical uplink data channel.

4. A user equipment (UE) comprising:
a transceiver; and
a processor,
wherein the transceiver is configured to:
receive a first signal from a base station (BS) through a first slot;
transmit, to the base station (BS), a second signal including hybrid automatic repeat and request acknowledgement/negative-acknowledgement (HARQ-ACK/NACK) feedback for the first signal; and
receive, from the base station (BS), channel configuration information to change a channel configuration based on the second signal further including information on a failure of a self-interference cancellation related to the reception of the first signal,
wherein, based on the second signal being a sounding reference signal (SRS) transmitted in a second slot, the information on the failure of the self-interference cancellation is provided to the BS through a specific value of a cyclic shift (CS) for the SRS.

5. A base station (BS) comprising:
a transceiver; and
a processor,
wherein the transceiver is configured to:
transmit a first signal to a user equipment (UE) through a first slot;
receive, from the user equipment (UE), a second signal including hybrid automatic repeat and request acknowledgement/negative-acknowledgement (HARQ-ACK/NACK) feedback for the first signal; and
transmit, to the user equipment (UE), channel configuration information to change a channel configuration based on the second signal further including information on a failure of a self-interference cancellation related to the reception of the first signal,
wherein, based on the second signal being a sounding reference signal (SRS) transmitted in a second slot, the information on the failure of the self-interference cancellation is obtained through a specific value of a cyclic shift (CS) for the SRS.

* * * * *